(12) United States Patent
Spender et al.

(10) Patent No.: US 11,345,831 B2
(45) Date of Patent: May 31, 2022

(54) BIOBASED CARRIER COATINGS

(71) Applicant: GREENTECH GLOBAL PTE. LTD., Singapore (SG)

(72) Inventors: Jonathan Spender, Enfield, ME (US); Michael Albert Bilodeau, Brewer, ME (US); Samuel Mikail, Kew Gardens, NY (US)

(73) Assignee: GREENTECH GLOBAL PTE. LTD., Singapore (SG)

( * ) Notice: Subject to any disclaimer, the term of this patent is extended or adjusted under 35 U.S.C. 154(b) by 265 days.

(21) Appl. No.: 16/568,953

(22) Filed: Sep. 12, 2019

(65) Prior Publication Data

US 2020/0002572 A1    Jan. 2, 2020

Related U.S. Application Data

(63) Continuation-in-part of application No. 15/693,186, filed on Aug. 31, 2017, now Pat. No. 10,730,959.

(60) Provisional application No. 62/730,241, filed on Sep. 12, 2018, provisional application No. 62/468,229, filed on Mar. 7, 2017, provisional application No. 62/432,133, filed on Dec. 9, 2016, provisional application No. 62/382,690, filed on Sep. 1, 2016.

(51) Int. Cl.
| | | |
|---|---|---|
| *C09D 189/00* | (2006.01) |
| *C09D 5/00* | (2006.01) |
| *B65D 65/46* | (2006.01) |
| *B65D 3/04* | (2006.01) |
| *B65D 65/42* | (2006.01) |
| *C09D 191/00* | (2006.01) |

(52) U.S. Cl.
CPC ............. *C09D 189/00* (2013.01); *B65D 3/04* (2013.01); *B65D 65/42* (2013.01); *B65D 65/466* (2013.01); *C09D 5/00* (2013.01); *C09D 191/00* (2013.01)

(58) Field of Classification Search
CPC ...... C09D 189/00; C09D 5/00; C09D 191/00; Y02W 90/10
See application file for complete search history.

(56) References Cited

U.S. PATENT DOCUMENTS 3,479,191 A * 11/1969 Cole ..................... A23B 7/16
426/303

OTHER PUBLICATIONS

Ozcalik et al., Journal of Food Engineering, 2013, 114, p. 505-513. (Year: 2013).*

* cited by examiner

*Primary Examiner* — Jonathan S Lau
(74) *Attorney, Agent, or Firm* — Sughrue Mion, PLLC

(57) ABSTRACT

The present invention describes tunable methods of treating cellulosic materials with a barrier coating comprising a prolamine and at least one polyol fatty acid ester that provides increased oil and/or grease resistance to such materials without sacrificing the biodegradability thereof. The methods as disclosed provide for adhering of the barrier coating on articles including articles comprising cellulosic materials and articles made by such methods. The materials thus treated display higher lipophobicity and may be used in any application where such features are desired.

18 Claims, 5 Drawing Sheets

BIOBASED CARRIER COATINGS

CROSS REFERENCE TO RELATED APPLICATIONS

This application is a continuation-in-part of U.S. Ser. No. 15/693,186 that was filed Aug. 31, 2017 (now U.S. Pat. No. 10,730,959), which claims benefit under 35 U.S.C. § 119(e) to U.S. Ser. Nos. 62/382,690, filed Sep. 1, 2016; 62/432,133, filed Dec. 9, 2016; and 62/468,229, filed Mar. 7, 2017, and this application claims benefit under 35 U.S.C. § 119(e) to U.S. Ser. No. 62/730,241, filed Sep. 12, 2018, all and each of which is incorporated herein by reference in entirety.

FIELD OF THE INVENTION

The present invention relates generally to treating cellulosic-compound containing materials, and more specifically to making cellulose-based materials more hydrophobic/lipophobic using biobased barrier coatings and/or compositions containing polyol fatty acid esters and prolamines, which polyol fatty acid esters may be used in place of known prolamine solvents or plasticizers, where such barrier coatings or compositions and methods are useful in modifying surfaces of cellulose-based materials including paper, paperboard and packaging products.

BACKGROUND INFORMATION

Industry has utilized compounds based on fluorocarbon chemistry for many years to produce articles having improved resistance to penetration by oil and/or grease, due to the ability of fluorocarbons to lower the surface energy of the articles. One emerging issue with the use of perfluorinated hydrocarbons is persistence in the environment. The EPA and FDA have recently begun a review of the source, environmental fate and toxicity of those compounds. A recent study reported a very high (>90%) rate of occurrence of perfluorooctane sulfonate in blood samples taken from school children. The expense and potential environmental liability of those compounds has driven manufacturers to seek alternative means of producing articles having resistance to penetration by oil and/or grease.

While lowering surface energy improves penetration resistance of articles, lowering surface energy also has some disadvantages. For example, a textile fabric treated with a fluorocarbon will exhibit good stain resistance, however, once soiled, the ability of cleaning compositions to penetrate and hence to release the soil from the fabric may be affected, which can result in permanently soiled fabrics of reduced useful life. Another example is a grease-proof paper which is to be subsequently printed and or coated with an adhesive. In that case, the requisite grease resistance is attained by treatment with the fluorocarbon, but the low surface energy of the paper may cause problems related to printing ink or adhesive receptivity, including blocking, back trap mottle, poor adhesion and register. If a grease-proof paper is to be used as a release paper having an adhesive applied, the low surface energy may reduce strength of the adhesion. To improve printability, coat-ability or adhesion, low surface energy articles can be treated by a post forming process, such as, corona discharge, chemical treatment, flame treatment or the like. However, those processes increase cost of producing the articles and may have other disadvantages.

Prolamines are proteinaceous compounds present as storage proteins of cereal grains. For example, zein is a prolamine found in corn gluten meal, a by-product of corn milling. Zein has a higher proline content and is soluble in aqueous aliphatic alcohols. Zein properties can be modified using certain plasticizers. Since the primary use for corn gluten meal is animal feed, which typically sells for a low price, there has been interest in development of value-added products from zein. However, many of the solvents and plasticizers are unsuitable for use in the food industry.

Renewed interest in zein as a polymeric material has been stimulated, in part, by the negative impact of plastic on solid waste disposal. Zein offers several potential advantages as a raw material for film, coatings and plastics applications. Zein is biodegradable and is annually renewable. The annual surpluses of corn provide a substantial raw material resource. However, there are also problems with use of zein as a plastic material. Zein is a biological material and like most biological materials, is affected by water. To better exploit those proteins, it would be desirable to formulate zein-containing compositions in ways to make sought after prolamine properties less susceptible to water.

SUMMARY OF THE INVENTION

The present disclosure relates to methods of treating cellulosic materials, including treating cellulose-containing materials with a composition that provides increased lipophobicity while maintaining biodegradability/recyclability of the cellulosic components. The methods as disclosed include applying a barrier coating comprising a prolamine and a polyol, such as, a saccharide, fatty acid ester (PFAE or SFAE) on cellulose.

In embodiments, a barrier coating comprising a prolamine and at least one PFAE, such as, an SFAE is disclosed, where the coating is present at a sufficient concentration to cause a surface of an article exposing the coating to become substantially resistant to application of oil and/or grease. In a related aspect, the prolamine includes zein, hordein, gliadin, kafirin and combinations thereof.

In one aspect, the at least one PFAE comprises a cyclic compound. In an embodiment, the at least one PFAE comprises a carbohydrate. In an embodiment, the at least one PFAE comprises an oligosaccharide. In embodiments, the at least one PFAE comprises a monosaccharaide, a disaccharide or a trisaccharide. In embodiments, the at least one PFAE comprises a disaccharide. In embodiments, the at least one PFAE comprises a sucrose or a lactose. In an aspect, the polyol comprises 1 to 2 fatty acid moieties or 3 to 5 fatty acid moieties. In an aspect, a fatty acid moiety is saturated or a combination of saturated and unsaturated fatty acids.

In an aspect, the coating comprises one or more compositions including polyvinyl alcohol (PvOH), polylactic acid (PLA), clay, precipitated calcium carbonate, ground calcium carbonate, natural and/or synthetic latexes, $TiO_2$, talc, glyoxyl and combinations thereof.

In one aspect, the fatty acid moiety is obtained from a natural source. In a related aspect, the natural source is an oilseed, and the oilseed includes soybeans, peanuts, rapeseeds, barley, canola, sesame seeds, cottonseeds, palm kernels, grape seeds, olives, safflowers, sunflowers, copra, corn, coconuts, linseed, hazelnuts, wheat, rice, potatoes, cassavas, legumes, camelina seeds, mustard seeds, and combinations thereof.

In one aspect, the PFAE is a mono-ester, di-ester, tri-ester, tetra-ester, penta-ester or a mixture thereof.

In another aspect, the barrier coating is biodegradable and/or compostable. In a related aspect, the article is paper, paperboard, paper pulp, a carton for food storage, a bag for food storage, a shipping bag, a container for coffee or tea, a tea bag, bacon board, diapers, weed-block/barrier fabric or film, mulching film, plant pots, packing beads, bubble wrap, oil absorbent material, laminates, envelopes, gift cards, credit cards, gloves, raincoats, oil and grease resistant (OGR) paper, a shopping bag, a compost bag, release paper, eating utensil, container for holding hot or cold beverages, cup, paper towels, plate, a bottle for carbonated liquid storage, insulating material, a bottle for non-carbonated liquid storage, film for wrapping food, a garbage disposal container, a food handling implement, a lid for a cup, a fabric fibre, a water storage and conveying implement, a storage and conveying implement for alcoholic or non-alcoholic drinks, an outer casing or screen for electronic goods, an internal or external piece of furniture, a curtain, upholstery, film, box, sheet, tray, pipe, water conduit, packaging for pharmaceutical products, clothing, medical device, contraceptive, camping equipment, cellulosic material that is molded and combinations thereof.

In one embodiment, a method for tuneably derivatizing a cellulose-based material for lipophobic resistance is disclosed including contacting the cellulose-based material with a barrier coating comprising a prolamine and at least one polyol fatty acid ester (PFAE), such as, a saccharide fatty acid ester (SFAE) and exposing the contacted cellulose-based material to heat, radiation, a catalyst or combination thereof for a sufficient time to adhere the barrier coating to the cellulose-based material. In a related aspect, the method may include removing excess barrier coating. In another related aspect, the barrier coating is applied on a size press.

In one embodiment, a barrier coating is disclosed including at least one saccharide fatty acid ester (SFAE) and a prolamine. In a related aspect, the coating is present at a sufficient concentration on an article to cause a surface of the article to become substantially resistant to application of oil and/or grease in the absence of secondary lipophobes. In a further related aspect, the barrier coating further includes clay, talc, precipitated calcium carbonate, ground calcium carbonate, $TiO_2$ and combinations thereof.

DETAILED DESCRIPTION OF THE INVENTION

Figure 1:
FIG. 1 shows a scanning electron micrograph (SEM) of untreated, medium porosity Whatman Filter Paper (58× magnification).

Before the present composition, methods, and methodologies are described, it is to be understood that the instant invention is not limited to particular compositions, methods and experimental conditions described, as such compositions, methods and conditions may vary. It is also to be understood that the terminology used herein is for purposes of describing particular embodiments only, and is not intended to be limiting, since the scope of the present invention will be limited only in the appended claims.

As used in the instant specification and the appended claims, the singular forms, "a," "an," and, "the," include plural references unless the context clearly dictates otherwise. Thus, for example, references to, "a saccharide fatty acid ester," includes one or more saccharide fatty acid esters, and/or compositions of the type described herein which will become apparent to those persons skilled in the art on reading the instant disclosure and so forth.

Unless defined otherwise, all technical and scientific terms used herein have the same meaning as commonly understood by one of ordinary skill in the art to which the invention belongs. Any methods and materials similar or equivalent to those described herein may be used in the practice or testing of the invention, as it will be understood that modifications and variations are encompassed within the spirit and scope of the instant disclosure.

As used herein, "about," "approximately," "substantially," and, "significantly," will be understood by a person of ordinary skill in the art and will vary in some extent depending on the context in which the terms are used. If there are uses of the term which are not clear to persons of ordinary skill in the art given the context in which the term is used, "about," and, "approximately," will mean plus or minus <10% of particular term and, "substantially," and, "significantly," will mean plus or minus >10% of the particular term. "Comprising," and, "consisting essentially of," have customary meaning in the art.

The present disclosure provides compositions and methods for the production of value-added products from prolamines, such as, zein, including producing stable aqueous barrier coatings and/or compositions. When applied to a surface or to a substrate, the compositions produce an article having resistance to oil and/or grease. The composition achieves those barrier properties while producing articles having high surface energy. As a result, the compositions avoid the disadvantages associated with use of barrier compositions that lower surface energy of articles.

In embodiments, a barrier coating or composition according to the instant disclosure includes one or more prolamines. Prolamines are proteinaceous compounds present as the storage proteins of cereal grains, such as corn, wheat, barley, rice and sorghum. Representative prolamines include, for example, zein, hordein, gliadin and kafirin. In a related aspect, the prolamine may be zein. Zein is available commercially from various manufacturers, including Global Protein Products, Fairfield, Me.

In embodiments, the barrier coating or composition also includes one or more polyol or saccharide fatty acid esters, including sucrose fatty acid esters. In a related aspect, the composition comprises a zein and a polyol fatty acid ester.

In one aspect, a polyol fatty acid ester may be used to replace known zein plasticizers, including known primary and secondary plasticizers (see, e.g., Table IV in Lawton J W, Cereal Chem (2002) 79(1): 1-18, herein incorporated by reference in entirety), such as, glycols, sulfonamides, amides, glycol, sorbitol, ethylene glycol and so on.

In embodiments, the present disclosure shows that by treating the surface of a substrate with barrier compositions comprising zein-polyol fatty acid ester combinations the resulting surface is made resistant to oil and/or grease. The polyol fatty acid ester and zein, for example, once removed by bacterial enzymes, are digested and thus, biodegradability of the substrate is not affected by the barrier coating. The barrier compositions as disclosed herein are therefore an ideal solution for derivatizing the surface of cellulose substrates to produce articles having a high surface energy. In addition, the polyol fatty acid esters reduce the effect of moisture (water) on zein-specific properties (e.g., film formation, tensile strength and the like).

In embodiments, polyol fatty acid esters containing saturated fatty acid moieties with low range degree of substitution (DS) of 1-2; or mid-range DS of 3-5 may be used directly with prolamines. In one aspect, when sucrose fatty acid esters having DS of 1-5 are heated to melting points, zein may be blended in directly. In a related aspect, such a mixture then may be converted to an aqueous zein dispersion by added kinetic energy (mixing) and water. In a further related aspect, such dispersions are stable—at least for days.

DS relates to the number of fatty acid moieties attached to the polyol. In embodiments, the DS metric represents an average over a population of molecules. Fatty acids can be obtained from a naturally occurring source, for example, an animal source, and hence, represent a population of different fatty acids rather than a pure source of only a single fatty acid species. Also, because of the heterogeneity of the fatty acid starting material, formation of a compound material, such as, a PFAE, can yield a mixed population of products, depending also on the polyol used. Thus, products often contain a range of DS rather than a population with a single DS.

In contrast, polyol fatty acid esters containing unsaturated fatty acid moieties with DS>5 and polyol fatty acid esters containing saturated fatty acid moieties with DS>5 (i.e., low HLB values) do not demonstrate compatibility with prolamines under the same conditions. While not being bound by theory, it is thought those esters (i.e., highly substituted, low HLB values) are too hydrophobic to emulsify the amphiphilic/hydrophobic proteins. In one aspect, that compatibility as disclosed herein is potentially more commercially useful since certain of those polyol fatty acid esters may provide grease resistance when used alone. As disclosed herein, use of mid-range substituted polyol esters alone on the surface of papers also provides a high contact angle and low kit value. In a related aspect, contact angles may range from 50-100° depending on which ester and which applied oil are used. Under conditions as disclosed herein, oil is observed to form beads instead of spreading across the treated surface using those esters. Further, while the ester(s) readily allow oil to penetrate depending on the pressure applied to the droplet, when the zein and ester are combined, to the extent the zein forms a film, a corresponding increase in kit value is observed.

Due to the high molecular weight of prolamines, a significant amount of, "solvent," is needed to dissolve the proteins completely. Known prolamine solvents include aniline, acetic acid, ethylene glycol, ethylene diamine, glycerol, lactic acid, methanol, pyridine and so on. Other solvents include mixtures with water, for example, acetone or ethanol; with a lower aliphatic alcohol, for example, acetone, benzene and furfural; and so on. In one aspect, the mass of the solvent has to be equal to or greater than the mass of the prolamine. In a related aspect, excess polyol ester is necessary to stabilize the protein, and as water is added, a stable aqueous dispersion is produced. While not being bound by theory, since zein repels grease via the formation of an insoluble, high surface energy film, it is essential that the dissolved or dispersed proteins be as uniformly distributed so proper film formation takes place on the substrate when the water is removed.

Advantages of the products and methods as disclosed herein include that the coating composition is made from renewable agricultural resources-zein, polyol and vegetable oils; is biodegradable; has a low toxicity profile; is suitable for food contact; may be tuned to reduce the coefficient of friction of the paper/paperboard surface (i.e., does not make the paper too slippery for downstream processing or end use), even at high levels of water resistance and to take into account the applied oil and/or grease; may or may not be used with special emulsification equipment or emulsification agents; and is compatible with traditional paper recycling programs, i.e., poses no adverse impact on recycling operations as do, for example, polyethylene, PLA or wax-coated papers.

Additional advantages include, but are not limited to:
a) some polyol esters demonstrate significant kit and show oil beading on treated surfaces (i.e., high surface energy) in the absence of secondary lipophobes;
b) polyol esters provide some kit even with limited amounts of carbonate added, which allows for savings on formulations, including that the barrier coating as disclosed herein overcomes problems associated with calcium carbonate and grease resistance (i.e., the presence of calcium carbonate in any form usually destroys any grease resistance in paper);
c) polyol esters may be used in place of known zein solvents (see, e.g. Table I, Lawton (2002), supra, herein incorporated by reference in entirety);
d) a formulation may be made in which all of the materials (PFAE, zein, inorganic particles/pigments, such as, calcium carbonate, clay and the like) in a barrier coating (except water) may provide separate functionality;
e) the PFAE in the barrier coating makes zein less susceptible to the effects of water; and
f) certain PFAE's or combinations of PFAE's (i.e., those with low to mid-range DS; 1 to 2 fatty acid moieties and 3-5 fatty acid moieties, respectively) favor prolamine blending.

As used herein, "adhere," means to stick fast to, for example, a surface, a substrate or a substance).

As used herein, "barrier coating," or, "barrier composition," means a material applied to a surface (or surfaces) of a substrate that blocks or hinders contact of unwanted elements with one or more of the applied surfaces, thus stopping or preventing contact of said unwanted elements, such as, oil or grease, with the applied surface(s) of said substrate.

As used herein, "biobased," means a material intentionally made from substances derived from living (or once-living) organisms. In a related aspect, material containing at least about 50% of such substances is considered biobased.

As used herein, "bind," including grammatic variations thereof, means to cohere or to cause to cohere essentially as a single mass.

As used herein, "cellulosic," means natural, synthetic or semisynthetic materials that can be molded or extruded into objects (e.g., bags, sheets) or films or filaments, which may be used for making such objects or films or filaments, that is structurally and functionally similar to cellulose, e.g., coatings and adhesives (e.g., carboxymethylcellulose). In another example, cellulose, a complex carbohydrate $(C_6H_{10}O_5)_n$ that is composed of glucose units, which forms the main constituent of the cell wall in most plants, is cellulosic.

As used herein, "coating weight," is the weight of a material (wet or dry) applied to a substrate. It can be expressed in pounds per specified ream or grams per square meter.

As used herein, "compostable," means those solid products are biodegradable into the soil.

As used herein, "edge wicking," means sorption of water in a paper structure at the outside limit of said structure by one or more mechanisms including, but not limited to, capillary penetration in the pores between fibers, diffusion through fibers and bonds, and surface diffusion on the fibers. In a related aspect, the polyol fatty acid ester containing coating as described herein prevents edge wicking in treated products. In one aspect, a similar problem exists with grease/oil entering creases that may be present in paper or paper products. Such a, "grease creasing effect," may be defined as the sorption of grease in a paper structure that is created by folding, pressing or crushing said paper structure.

As used herein, "effect," including grammatical variations thereof, means to impart a particular property to a specific material.

As used herein, "hydrophobe," means a substance that does not attract water. For example, waxes, rosins, resins, polyol fatty acid esters, diketenes, shellacs, vinyl acetates, PLA, polyethyleneimine (PEI), oils, fats, lipids, other water repellant chemicals or combinations thereof are hydrophobes.

As used herein, "hydrophobicity," means the property of being water-repellent, tending to repel and not to absorb water.

As used herein, "high surface energy," means an article having a surface energy of at least about 32 dynes/cm, and commonly at least about 36 dynes/cm. Less than that would be considered, "low surface energy." Surface energy can be measured by any suitable method, for example by contact angle measurement and the relationship between surface energies using Young's Equation. Higher surface energy reflects stronger molecular attraction between dissimilar materials.

As used herein, "lipid resistance," or, "lipophobicity," means the property of being lipid-repellent, tending to repel and not to absorb lipids, grease, fats and the like. In a related aspect, the grease resistance may be measured by a, "3M KIT," test or a TAPPI T559 Kit test. In another related aspect, "secondary lipophobes" would be substances that have lipid resistant properties, such as perfluoroalkyls and polyfluoroalkyls, for example.

As used herein, "cellulose-containing material," or, "cellulose-based material," means a composition which consists essentially of cellulose. For example, such material may include, but is not limited to, paper, paper sheets, paperboard, paper pulp, a carton for food storage, parchment paper, cake board, butcher paper, release paper/liner, a bag for food storage, a shopping bag, a shipping bag, bacon board, insulating material, tea bags, containers for coffee or tea, a compost bag, eating utensil, container for holding hot or cold beverages, cup, a lid, plate, a bottle for carbonated liquid storage, gift cards, a bottle for non-carbonated liquid storage, film for wrapping food, a garbage disposal container, a food handling implement, a fabric fibre (e.g., cotton or cotton blends), a water storage and conveying implement, alcoholic or non-alcoholic drinks, an outer casing or screen for electronic goods, an internal or external piece of furniture, a curtain and upholstery.

As used herein, "release paper," means a paper sheet used to prevent a sticky surface from prematurely adhering to an adhesive or a mastic. In one aspect, the coatings as disclosed herein can be used to replace or to reduce use of silicon or other coatings to produce a material having a low surface energy. Determining surface energy may be achieved by measuring contact angle (e.g., Optical Tensiometer and/or High Pressure Chamber; Dyne Testing, Staffordshire, United Kingdom) or by use of Surface Energy Test Pens or Inks (see, e.g., Dyne Testing, Staffordshire, United Kingdom).

As used herein, "releasable," with reference to the PFAE means that the PFAE coating, once applied, may be removed from the cellulose-based material (e.g., removable by manipulating physical properties). As used herein, "non-releasable," with reference to the PFAE means that the PFAE coating, once applied, is substantially irreversibly bound to the cellulose-based material (e.g., removable by chemical means).

As used herein, "fluffy," means an airy, solid material having the appearance of raw cotton or a Styrofoam peanut. In embodiments, the fluffy material may be made from nanocellulose fibers (e.g., MFC) cellulose nanocrystals and/or cellulose filaments; and polyol fatty acid esters, where the resulting fibers or filaments or crystals are hydrophobic (and dispersible), and may be used in composites (e.g., concretes, plastics and the like).

As used herein, "fibers in solution," or, "pulp," means a lignocellulosic fibrous material prepared by chemically or mechanically separating cellulose fibers from wood, fiber crops or waste paper. In a related aspect, where cellulose fibers are treated by the methods as disclosed herein, the cellulose fibers themselves contain bound polyol fatty acid esters as isolated entities, and where the bound cellulose fibers have separate and distinct properties from free fibers (e.g., pulp, cellulose fiber, nanocellulose or microfibrillated cellulose-polyol fatty acid ester bound material would not form hydrogen bonds between fibers as readily as unbound fibers).

As used herein, "repulpable," means to make a paper or paperboard product suitable for crushing into a soft, shapeless mass for reuse in production of paper or paperboard.

As used herein, "stable aqueous composition," means an aqueous composition which is substantially resistant to viscosity change, coagulation and sedimentation over at least an 8-hour period when contained in a closed vessel and stored at a temperature in a range of from about 0° C. to about 60° C. Some embodiments of the composition are stable over at least a 24-hour period, and often over at least a 6-month period.

As used herein, "tunable," including grammatic variations thereof, means to adjust or to adapt a process to achieve a particular result. For example, a particular PFAE can be combined with a particular substrate exposed to a particular oil and/or a particular grease to render that treated substrate resistant to that particular oil and/or to that particular grease.

As used herein, "water contact angle," means the angle measured through a liquid, where a liquid/vapor interface meets a solid surface. It quantifies the wettability of the solid surface by the liquid. The contact angle is a reflection of how strongly the liquid and solid molecules interact with each other, relative to how strongly each interacts alone. On many highly hydrophilic surfaces, water droplets will exhibit contact angles of 0° to 30°. Generally, if the water contact angle is larger than 90°, the solid surface is considered hydrophobic. Water contact angle may be readily obtained using an Optical Tensiometer (see, e.g., Dyne Testing, Staffordshire, United Kingdom).

As used herein, "water vapour permeability," means breathability or ability of a textile to transfer moisture. There are at least two different measurement methods. One, the MVTR Test (Moisture Vapour Transmission Rate) in accordance with ISO 15496, describes the water vapor permeability (WVP) of a fabric and therefore the degree of perspiration transport to the outside air. The measurements determine how many grams of moisture (water vapor) pass through a square meter of fabric in 24 hours (the higher the level, the higher the breathability).

Other testing methods to measure MVTR include ASTM E96 and ASTM F1249.

A variation of ASTM E96 employs a chamber to measure moisture resistance. The chamber is divided vertically by the substrate/barrier material. A dry atmosphere is in one chamber, and a moist atmosphere is in the other. A 24-hour test is run to see how much moisture passes through the substrate/barrier from the, "wet," chamber to the, "dry," chamber. ASTM E96 can specify any one of five combinations of temperature and humidity in the, "wet," chamber. The most rigorous conditions are 100° F./95% RH (relative humidity). The method can be time consuming and pressure changes may impact the actual results.

ASTM F1249 is an MVTR measurement method that uses infrared (IR) detectors to measure changes in RE on the dry side of a film in a chamber similar to the one used in the ASTM E96 method. Water is placed in the bottom of the chamber to create a 100% RH atmosphere. Barrier material is used to divide the bottom and top. The top side of the chamber is ventilated with dry air and change in RH is measured with an IR detector. A disadvantage of that method is RH is limited to 100% unless special equipment is used that allows control over RH.

In one aspect, a TAPPI T 530 Hercules size test (i.e., size test for paper by ink resistance) may be used to determine water resistance. Ink resistance by the Hercules method is best classified as a direct measurement test for degree of penetration. Others classify the assay as a rate of penetration test. There is no one best test for, "measuring sizing." Test selection depends on end use and mill control needs. The Hercules method is suitable as a mill control sizing test to detect changes in sizing level. That test offers sensitivity of the ink float test while providing reproducible results, shorter test times and automatic end point determination.

Sizing, as measured by resistance to permeation through or absorption into paper of aqueous liquids, is an important characteristic of many papers. Typical of those are bag, containerboard, butcher's wrap, writing and some printing grades.

That method may be used to monitor paper or board production for specific end uses provided acceptable correlation has been established between test values and the paper end use performance. Due to the nature of the test and the penetrant, a test may not necessarily correlate sufficiently to be applicable to all end use requirements. That method measures sizing by rate of penetration. Other methods measure sizing by surface contact, surface penetration or absorption. Size tests are selected based on the ability to simulate the means of water contact or absorption in end use. That method also can be used to optimize size chemical usage costs.

As used herein, "oxygen permeability," means the degree to which a polymer allows the passage of a gas or fluid. Oxygen permeability (Dk) of a material is a function of the diffusivity (D) (i.e., the speed at which oxygen molecules traverse the material) and the solubility (k) (or the amount of oxygen molecules absorbed, per volume, in the material). Values of oxygen permeability (Dk) typically fall within the range $10\text{-}150\times10^{-11}$ (cm$^2$ ml O$_2$)/(s ml mmHg). A semi-logarithmic relationship has been demonstrated between hydrogel water content and oxygen permeability (unit: Barrer unit). The International Organization for Standardization (ISO) has specified permeability using the SI unit, hectopascal (hPa) for pressure. Hence Dk=$10^{-11}$ (cm$^2$ ml O$_2$)/(s ml hPa). The Barrer unit can be converted to the hPa unit by multiplying Barrer value with the constant, 0.75.

As used herein, "biodegradable," including grammatic variations thereof, means capable of being broken down especially into innocuous products by the action of living things (e.g., by microorganisms).

As used herein, "recyclable," including grammatic variations thereof, means a material that is treatable or that can be processed (with used and/or waste items) so as to make said material suitable for reuse.

As used herein, "Gurley second," or, "Gurley number," is a unit describing the number of seconds required for 100 cubic centimeters (deciliter) of air to pass through 1.0 square inch of a given material at a pressure differential of 4.88 inches of water (0.176 psi) (ISO 5636-5:2003) (Porosity). In addition, for stiffness, "Gurley number," is a unit for a piece of vertically held material measuring the force required to deflect said material a given amount (1 milligram of force). Such values may be measured on a Gurley Precision Instruments device (Troy, N.Y.).

HLB relates to the hydrophilic-lipophilic balance of a molecule and is a measure of the degree to which a moiety is hydrophilic or lipophilic, determined by calculating values for the different regions of the molecule.

Griffin's method for non-ionic surfactants as described in 1954 is:

$$HLB=20*M_h/M$$

where $M_h$ is the molecular mass of the hydrophilic portion of the molecule, and M is the molecular mass of the whole molecule, giving a result on a scale of 0 to 20. An HLB value of 0 corresponds to a completely lipophilic/hydrophobic molecule, and a value of 20 corresponds to a completely hydrophilic/lipophobic molecule.

The HLB value can be used to predict the surfactant properties of a molecule:
<10: Lipid-soluble (water-insoluble)
>10: Water-soluble (lipid-insoluble)
1.5 to 3: anti-foaming agent
3 to 6: W/O (water in oil) emulsifier
7 to 9: wetting and spreading agent
13 to 15: detergent
12 to 16: O/W (oil in water) emulsifier
15 to 18: solubiliser or hydrotrope In embodiments, the HLB values for the polyol fatty acid esters (or composition comprising said ester) as disclosed herein may be in the lower range, 1-3. In embodiments, the HLB values for the polyol fatty acid esters (or composition comprising said ester) as disclosed herein may be in the middle to higher ranges. In an aspect, the combination of PFAE and zein to form a stable aqueous composition entails use of such esters having mid-range HLB values, 4-10.

As used herein, "SEFOSE®," denotes a sucrose fatty acid ester made from soybean oil (soyate) which is commercially available from Procter & Gamble Chemicals (Cincinnati, Ohio) under the trade name SEFOSE® 1618U (see sucrose polysoyate below), which contains one or more fatty acids that are unsaturated.

As used herein, "OLEAN®," denotes a sucrose fatty acid ester which is available from Procter & Gamble Chemicals having the formula $C_{n+12}H_{2n+22}O_{13}$, where all fatty acids are saturated.

Other PFAE's having various HLB values and variety of fatty acid moieties may be obtained from Mitsubishi Chemical Foods Corporation (Tokyo, JP), under the tradename, RYOTO™.

As used herein, "soyate," means a mixture of salts of fatty acids from soybean oil.

As used herein, "oilseed fatty acids," means fatty acids from plants, including, but not limited to, soybeans, peanuts, rapeseeds, barley, canola, sesame seeds, cottonseeds, palm kernels, grape seeds, olives, safflowers, sunflowers, copra, corn, coconuts, linseed, hazelnuts, wheat, rice, potatoes, cassavas, legumes, camelina seeds, mustard seeds and combinations thereof.

As used herein, "plasticizer," means additives that increase plasticity or decrease viscosity of a material. Those are the substances which are added to alter physical properties. Those are either liquids with low volatility or may be even solids. A plasticizer decreases attraction between polymer chains to encourage flexibility.

In embodiments, "fatty acid," comprises a carboxylic acid comprising an aliphatic chain, which may be branched. The aliphatic chain can be saturated or can comprise one or more unsaturated bonds, such as a carbon:carbon double bond, which can be cis or trans. The aliphatic chain can be a short chain, 5 or fewer carbons; a medium chain, 6-12 carbons; long chain, 13-21 carbons; or longer, 22 or more carbon atoms.

As used herein, "polyol" means an organic compound containing multiple hydroxyl groups. The polyol is biodegradable and recyclable. In embodiments, a polyol comprises a ring structure or a cyclic structure, such as, a furan, a pyran, a ribose, a deoxyribose, a ribonucleoside, a deoxynucleoside, a ribonucleotide, a deoxyribonucleotide and so on. In embodiments, a polyol comprises a carbohydrate. In embodiments, a polyol comprises a saccharide. In embodiments, a polyol comprises a monosaccharide, a disaccharide or a trisaccharide. In embodiments, a polyol comprises a glycosaminoglycan, a mucopolysaccharide and so on. In embodiments, a polyol comprises a glucose, fructose, galactose, ribose, deoxyribose, arabinose, xylose, mannose, sucrose, lactose and so on.

As used herein, "wet strength," means a measure of how well a web of fibers holding a paper together can resist a force of rupture when the paper is wet. Wet strength may be measured using a Finch Wet Strength Device from Thwing-Albert Instrument Company (West Berlin, N.J.). Where the wet strength is effected by additives, such as, kymene, cationic glyoxylated resins, polyamidoamine-epichlorohydrin resins, polyamine-epichlorohydrin resins, including epoxide resins, and so on. In embodiments, PFAE-coated cellulose-based material as disclosed herein effects such wet strength in the absence of such additives.

As used herein, "wet," means covered or saturated with water or another liquid.

In embodiments, a process as disclosed herein includes adhering a barrier coating to a cellulosic surface or contacting a cellulosic surface with said barrier coating which can bind to a cellulosic surface, where said process comprises contacting a cellulose-based material with a coating comprising a polyol fatty acid ester and a prolamine and exposing the contacted cellulose-based material to heat, radiation, a catalyst or a combination thereof for a sufficient time to bind the barrier coating to the cellulose based material. In a related aspect, such radiation may include, but is not limited to UV, IR, visible light or a combination thereof. In another related aspect, the reaction may be carried out at room temperature (i.e., 25° C.) to about 150° C., about 50° C. to about 100° C., about 60° C. to about 80° C.

In one aspect, the polyol fatty acid ester-prolamine barrier composition may contain a mixture of a mono-ester, a di-ester, a tri-ester, a tetra-ester, a penta-ester or combinations thereof. In another aspect, the barrier coating may contain other proteins, polysaccharides and lipids, including, but not limited to, milk proteins (e.g., casein, whey protein and the like), wheat glutens, gelatins, soy protein isolates, starches, modified starches, acetylated polysaccharides, alginates, carrageenans, chitosans, inulins, long chain fatty acids, waxes, and combinations thereof.

In embodiments, the coating may additionally contain PvOH.

In embodiments, no catalysts and no organic carriers (e.g., volatile organic compounds) are required to carry out adhering the coating to an article surface, including, that no build-up of material is contemplated using the method as disclosed. In a related aspect, the reaction time is substantially instantaneous. Further, the resulting material exhibits low blocking.

As disclosed herein, fatty acid esters of all polyols, including monosaccharides, disaccharides and trisaccharides, are adaptable for use in the present invention. In a related aspect, the polyol fatty acid ester may be a monoester, a diester, a triester, atetraester, a pentaester and combinations thereof, including that the fatty acid moieties may be saturated, unsaturated or a combination thereof.

While not being bound by theory, the interaction between the polyol fatty acid ester and the cellulose-based material may be by ionic, hydrophobic, hydrogen, van der Waals interaction, covalent bonding or a combination thereof. In a related aspect, the polyol fatty acid ester binding to the cellulose-based material is substantially irreversible (e.g., using a PFAE comprising a combination of saturated and unsaturated fatty acids). While not wanting to bound by theory, unsaturated fatty acids bind covalently to the surface.

Further, at a sufficient concentration, the binding of the polyol fatty acid ester alone is enough to make the cellulose-based material oil and/or grease resistant: i.e., lipophobicity is achieved in the absence of the addition of waxes, rosins, resins, diketenes, shellacs, vinyl acetates, natural and/or synthetic latexes, PLA, PEI, oils, other oil/grease repellant chemicals or combinations thereof (i.e., secondary lipophobes), including that other properties, such as, strengthening, stiffing, and bulking of the cellulose-based material may achieved by PFAE binding alone.

An advantage of the invention as disclosed is that multiple fatty acid chains are reactive with the cellulose, and with the polyol and cyclic molecules in the backbone of the structure or substrate, for example, the sucrose fatty acid esters as disclosed, a stiff crosslinking network is obtained, leading to strength improvements in fibrous webs, such as, paper, paperboard, air-laid and wet-laid non-wovens and textiles. That is typically not found in other sizing chemistries. In embodiments, a method of producing an article is disclosed using the barrier coatings above, which method produces an article which has a high surface energy and resistance to oil and/or grease penetration.

The invention also relates to an article which comprises the above-described composition applied to a substrate. The article has a high surface energy and resistance to oil and/or grease penetration. In a related aspect, the barrier coating as disclosed herein may be applied by size press, where other prolamine-containing coatings cannot.

Another advantage is that the polyol fatty acid esters as disclosed soften the fibers, increasing space between fibers, thus, increasing bulk without substantially increasing weight. In addition, fibers and cellulose-based material modified as disclosed herein, may be repulped. Further, for example, oil and/or grease cannot be easily, "pushed," past the barrier into the sheet treated with the barrier coating as described.

Saturated PFAE typically are meltable solids at nominal processing temperatures, whereas unsaturated PFAE typically are liquids. That permits formation of uniform, stable dispersions of saturated PFAE in aqueous coatings without significant interactions or incompatibilities with other coating components. In addition, such a dispersion allows for high concentrations of saturated PFAE to be prepared without adversely affecting coating rheology, uniform coating application or coating performance characteristics, hence, the ability to use a size press for coatings as described herein. The coating surface will become lipophobic when particles of prolamine and saturated PFAE melt and spread on heating, drying and consolidation of the coating layer. In embodiments, a method of producing bulky, fibrous structures that retain strength even when exposed to water is disclosed, as the prolamine contained in the coating is shielded by said esters. Formed fiber products made using the method as disclosed may include paper plates, drink holders (e.g., cups), lids, food trays and packaging that would be light weight, strong and be resistant to exposure to oil, grease, water and other liquids.

In embodiments, polyol fatty acid esters are mixed with prolamines to produce sizing agents for oil and/or grease resistant coatings. As disclosed herein, a synergistic relationship between polyol fatty acid esters and prolamines has been demonstrated. While it is known in the art that prolamines are film formers, prolamines are sensitive to water. In aspects, use of polyol fatty acid esters helps to emulsify prolamines into an aqueous coating.

In embodiments, the polyol fatty acid esters comprise or consist essentially of saccharide, such as, sucrose, esters of fatty acids. Many methods are known and available for making or otherwise providing the polyol fatty acid esters of the present invention, and all such methods are available for use within the scope of the present invention. For example, in embodiments, fatty acid esters are synthesized by esterifying a polyol with one or more fatty acid moieties obtained from oil seeds including, but not limited to, soybean oil, sunflower oil, olive oil, canola oil, peanut oil or mixtures thereof.

In embodiments, cyclic polyol fatty acid esters comprise a saccharide moiety, including but not limited to, a disaccharide moiety, such as, a sucrose moiety, which is substituted by an ester moiety at one or more hydroxyl hydrogens. In an embodiment, disaccharide esters have the structure of Formula I.

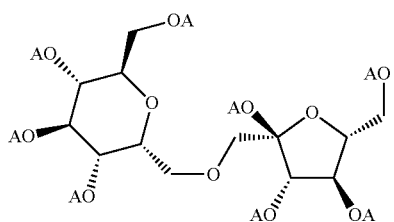

Formula I where "A" is hydrogen or Structure I below:

Structure I where, "R," is a linear, branched, or cyclic, saturated or unsaturated, aliphatic or aromatic moiety of about eight to about 40 carbon atoms, and where at least one, "A," is at least one, at least two, at least three, at least four, at least five, at least six, at least seven or all eight "A" moieties of Formula I are in accordance with Structure I. In an aspect, a disaccharide fatty acid ester as described herein may be a monoester, a diester, a triester, a tetraester, a pentaester and combinations thereof, where the R groups may be saturated or saturated and unsaturated groups.

Suitable, "R," groups include any form of aliphatic moiety, including those which contain one or more substituents, which may occur on any carbon in the moiety. Also included are aliphatic moieties which include functional groups within the moiety, for example, an ether, ester, thio, amino, phospho or the like. Also included are oligomer and polymer aliphatic moieties, for example, sorbitan, polysorbitan and polyalcohol moieties. Examples of functional groups which may be appended to the aliphatic (or aromatic) moiety comprising the, "R," group include, but are not limited to, halogens, alkoxy, hydroxy, amino, ether and ester functional groups. In one aspect, said moieties may have crosslinking functionalities. In another aspect, the PFAE may be cross-linked to a surface (e.g., activated clay/pigment particles). In another aspect, double bonds present on the PFAE may be used to facilitate reactions onto and with surfaces.

In embodiments, a polyol comprises a carbohydrate. In embodiments, a polyol comprise a saccharide. In embodiments, a polyol comprise a disaccharide. Suitable saccharides and oligosaccharides include raffinose, maltodextrose, galactose, sucrose, combinations of glucose, combinations of fructose, maltose, lactose, combinations of mannose, combinations of erythrose, isomaltose, isomaltulose, trehalose, trehalulose, cellobiose, laminaribiose, chitobiose and combinations thereof.

In embodiments, the polyol substrate or backbone for addition of fatty acids may include starches, hemicelluloses, lignins or combinations thereof.

In embodiments, a composition comprises a starch fatty acid ester, where the starch may be derived from any suitable source, such as, dent corn starch, waxy corn starch, potato starch, wheat starch, rice starch, sago starch, tapioca starch, sorghum starch, sweet potato starch, and mixtures thereof.

In embodiments, the starch may be an unmodified starch, or a starch that has been modified by a chemical, physical or enzymatic modification.

Chemical modification includes any treatment of a starch with a chemical that results in a modified starch (e.g., plastarch material). Within chemical modification are included, but not limited to, depolymerization of a starch, oxidation of a starch, reduction of a starch, etherification of a starch, esterification of a starch, nitrification of a starch, defatting of a starch, hydrophobization of a starch and the like. Chemically modified starches may also be prepared by using a combination of any of the chemical treatments. Examples of chemically modified starches include the reaction of alkenyl succinic anhydride, particularly octenyl succinic anhydride, with starch to produce a hydrophobic esterified starch; the reaction of 2,3-epoxypropyltrimethylammonium chloride with starch to produce a cationic starch; the reaction of ethylene oxide with starch to produce hydroxyethyl starch; the reaction of hypochlorite with starch to produce an oxidized starch; the reaction of an acid with starch to produce an acid depolymerized starch; defatting of a starch with a solvent, such as, methanol, ethanol, propanol, methylene chloride, chloroform, carbon tetrachloride, and the like, to produce a defatted starch.

Physically modified starches are starches that are physically treated in a manner to provide physically modified starches. Within physical modification is included, but not limited to, thermal treatment of the starch in the presence of water, thermal treatment of the starch in the absence of water, fracturing the starch granule by any mechanical means, pressure treatment of starch to melt the starch granules and the like. Physically modified starches may also be prepared by using a combination of any physical treatments. Examples of physically modified starches include the thermal treatment of starch in an aqueous environment to cause the starch granules to swell without granule rupture; the thermal treatment of anhydrous starch granules to cause polymer rearrangement; fragmentation of the starch granules by mechanical disintegration; and pressure treatment of starch granules by means of an extruder to cause melting of the starch granules.

Enzymatically modified starches are any starches that are enzymatically treated in any manner to provide enzymatically modified starches. Within enzymatic modification are included, but not limited to, reaction of an alpha amylase with starch, the reaction of a protease with starch, the reaction of a lipase with starch, the reaction of a phosphorylase with starch, the reaction of an oxidase with starch, and the like. Enzymatically modified starches may be prepared by using a combination of any of the enzymatic treatments. Examples of enzymatic modification of starch include the reaction of α-amylase enzyme with starch to produce a depolymerized starch; the reaction of α-amylase debranching enzyme with starch to produce a debranched starch; the reaction of a protease enzyme with starch to produce a starch with reduced protein content; the reaction of a lipase enzyme with starch to produce a starch with reduced lipid content; the reaction of a phosphorylase enzyme with starch to produce an enzyme modified phosphated starch; and the reaction of an oxidase enzyme with starch to produce an enzyme oxidized starch.

Disaccharide fatty acid esters may be sucrose fatty acid esters in accordance with Formula I wherein the, "R," groups are aliphatic and are linear or branched, saturated or both saturated and unsaturated, and have between about 8 and about 40 carbon atoms.

As used herein the terms, "polyol fatty acid ester," "polyol fatty acid ester," and, "sucrose fatty acid ester," include compositions possessing different degrees of purity as well as mixtures of compounds of any purity level. For example, the saccharide fatty acid ester compound can be a substantially pure material, that is, can comprise a compound having a given number of, "A," groups substituted by only one species of a Structure I moiety (that is, all "R" groups are the same and all of the polyol moieties are substituted to an equal degree). The terms also include a composition comprising a blend of two or more polyol fatty acid ester compounds, which differ in degrees of substitution, but wherein all of the substituents have the same, "R," group structure. The terms also include compositions which are a mixture of compounds having differing degrees of, "A," group substitution, and wherein the, "R," group substituent moieties are independently selected from two or more, "R," groups of Structure I. In a related aspect, "R," groups may be the same or may be different, including that said polyol fatty acid esters in a composition may be the same or may be different (i.e., a mixture of different polyol fatty acid esters).

For compositions of the present invention, the composition may be comprised of polyol fatty acid ester compounds having a lower DS. In embodiments, the polyol fatty acid ester is a sucrose polysoyate.

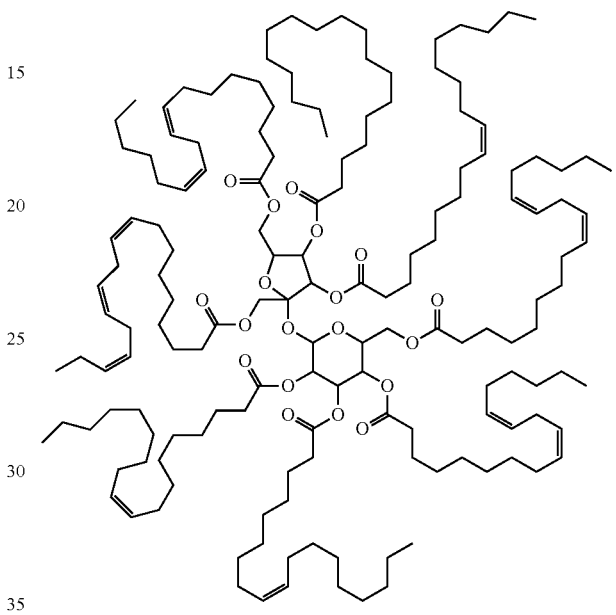

A Sucrose Polysoyate (SEFOSE® 1618U)

Polyol fatty acid esters may be made by esterification with substantially pure fatty acids by known processes of esterification, such as, by trans-esterification using polyol and fatty acid esters in the form of fatty acid glycerides derived, for example, from natural sources, for example, those found in oil extracted from oil seeds, for example soybean oil. Trans-esterification reactions providing polyol fatty acid esters using fatty acid glycerides are described, for example, in U.S. Pat. Nos. 3,963,699; 4,517,360; 4,518,772; 4,611,055; 5,767,257; 6,504,003; 6,121,440; and 6,995,232, and in WO1992004361, each herein incorporated by reference in entirety.

In addition to making hydrophobic polyol esters via transesterification, similar hydrophobic properties may be achieved in fibrous, cellulosic articles by directly reacting acid chlorides with polyols containing ring structures.

As mentioned above, polyol fatty acid esters may be prepared by trans-esterification of polyol from methyl ester feedstocks which have been prepared from glycerides derived from natural sources (see, e.g., U.S. Pat. No. 6,995,232, herein incorporated by reference in entirety). As a consequence of the source of the fatty acids, the feedstock used to prepare the polyol fatty acid ester contains a range of saturated and unsaturated fatty acid methyl esters having fatty acid moieties containing between 12 and 40 carbon atoms. That will be reflected in the product polyol fatty acid esters made from such a source in that the polyol moieties comprising the product will contain a mixture of ester moiety substituents, wherein, with reference to Structure I above, the, "R," groups will be a mixture having between 12 and 26 carbon atoms with a ratio that reflects the feedstock used to prepare the polyol ester. Further to illustrate that point, polyol esters derived from soybean oil will be a mixture of species, having, "R," group structures which reflect that soybean oil comprises 26 wt. % triglycerides of oleic acid (H$_3$C—CH$_2$]$_7$—CH=CH—[CH$_2$]$_7$—C(O)OH), 49 wt. % triglycerides of linoleic acid (H$_3$C—[CH$_2$]$_3$—[—CH$_2$—CH=CH]$_2$—[—CH$_2$—]$_7$—C(O)OH), 11 wt. % of triglycerides of linolenic acid (H$_3$C—[—CH$_2$—CH=CH—]$_3$—[—CH$_2$—]$_7$—C(O)OH) and 14 wt. % of triglycerides of various saturated fatty acids, as described in the Seventh Ed. Of the Merck Index, which is incorporated herein by reference in entirety. All of those fatty acid moieties are represented in the, "R," groups of the substituents in the product polyol fatty acid ester of interest. Accordingly, when referring to a polyol fatty acid ester herein as the product of a reaction employing a fatty acid feed stock derived from a natural source, for example, sucrose soyate, the natural source feed stock is intended to include all of the various constituents which are typically found as a consequence of the source from which the polyol fatty acid ester is prepared. In a related aspect, the polyol fatty acid esters as disclosed may exhibit low viscosity (e.g., between about 10 to 2000 centipoise at room temperature or under standard atmospheric pressure). In another aspect, the unsaturated fatty acids, may have one, two, three or more double bonds.

In embodiments of the present invention, the polyol fatty acid ester, and in aspects, the disaccharide ester, is formed from fatty acids having greater than about 6 carbon atoms, from about 8 to 16 carbon atoms, from about 8 to about 18 carbon atoms, from about 14 to about 18 carbons atoms, from about 16 to about 18 carbon atoms, from about 16 to about 20 carbon atoms, and from about 20 to about 40 carbon atoms, on average.

In embodiments, the polyol fatty acid ester to prolamine ratios in the barrier coatings may be tuned (varied) to achieve lipophobicity depending on the form of the cellulose-based material, the oil and/or grease to which the material is to be exposed, and so on. In one aspect, the PFAE to prolamine ratio may be 1:1, 2:1, 3:1, 4:1 or 5:1 on a weight to weight (wt/wt) basis. In a related aspect, when a polyol fatty acid ester and a prolamine are mixed as a coating on the cellulose-based material, a coating weight of at least about 0.1 g/m$^2$ to about 1.0 g/m$^2$, about 1.0 g/m$^2$ to about 2.0 g/m$^2$, about 2 g/m$^2$ to about 3 g/m$^2$ on a surface of the cellulose-based material, may be used. In a related aspect, the coating mixtures may be present from about 3 g/m$^2$ to about 4 g/m$^2$, about 4 g/m$^2$ to about 5 g/m$^2$, about 5 g/m$^2$ to about 10 g/m$^2$, about 10 g/m$^2$ to about 20 g/m$^2$. In another aspect, when the cellulose-based material is a solution containing cellulose fiber, the coating may be present at a concentration of at least about 0.025% (wt/wt) of the total fiber present. In a related aspect, the coating composition may be present at about 0.05% (wt/wt) to about 0.1% (wt/wt), about 0.1% (wt/wt) to about 0.5% (wt/wt), about 0.5% (wt/wt) to about 1.0% (wt/wt), about 1.0% (wt/wt) to about 2.0% (wt/wt), about 2.0% (wt/wt) to about 3.0% (wt/wt), about 3.0% (wt/wt) to about 4.0% (wt/wt), about 4.0% (wt/wt) to about 5.0% (wt/wt), about 5.0% (wt/wt) to about 10% (wt/wt), about 10% (wt/wt) to about 50% (wt/wt) of the total fiber present.

In embodiments, a coating may comprise between about 0.9% to about 1.0%, about 1.0% to about 5.0%, about 5.0 to about 10%, about 10% to about 20%, about 20% to about 30%, about 40% to about 50% or greater polyol fatty acid ester by weight of the coating (wt/wt). In a related aspect, the coating may contain between about 25% to about 35% polyol fatty acid ester by weight of the coating (wt/wt).

In embodiments, the cellulose-based material includes, but is not limited to, paper, paperboard, paper sheets, paper pulp, cups, boxes, trays, lids, release papers/liners, compost bags, shopping bags, shipping bags, bacon board, tea bags, insulating material, containers for coffee or tea, pipes and water conduits, food grade disposable cutlery, plates and bottles, screens for television and mobile devices, clothing (e.g., cotton or cotton blends), bandages, pressure sensitive labels, pressure sensitive tape, feminine products, and medical devices to be used on the body or inside it such as contraceptives, drug delivery devices, container for pharmaceutical materials (e.g., pills, tablets, suppositories, gels etc.), and the like. Also, the coating technology as disclosed may be used on furniture and upholstery, outdoors camping equipment and the like.

In one aspect, the coatings as described herein are resistant to pH in the range of between about 3 to about 9. In a related aspect, the pH may be from about 3 to about 4, about 4 to about 5, about 5 to about 7, about 7 to about 9.

In embodiments, a method for treating a surface of a cellulose containing (or cellulosic) material is disclosed including applying to the surface a composition containing an alkanoic acid derivative having the formula (II) or (III):

R—CO—X                              Formula (II)

X—CO—R—CO—X$_1$                     Formula (III), where R is a straight-chain, branched-chain, or cyclic aliphatic hydrocarbon radical having from 6 to 50 carbon atoms, and where X and X$_1$ are independently Cl, Br, R—CO—O—R, or O(CO)OR, where when the alkanoic acid derivative comprises formula (III) X or X$_1$ is the same or is different, where the PFAE as disclosed herein is a carrier, and where the method does not require an organic base, gaseous hydrochloric acid (HCl), volatile organic compounds (VOC's) or catalyst.

In embodiments, an alkanoic acid derivative is mixed with a polyol fatty acid ester to form an emulsion, where the emulsion is used to treat the cellulose-based material.

In embodiments, the polyol fatty acid ester may be an emulsifying agent and may comprise a mixture of one or more monoesters, diesters, triesters, tetraesters and pentaesters. In one aspect, the polyol fatty acid ester may be an emulsifying agent and may comprise a mixture of one or more triesters, tetraesters and pentaesters, or a mixture of one or both monoesters and diesters. In another aspect, the fatty acid moiety of the polyol fatty acid ester may contain saturated groups or a combination of saturated and unsaturated fatty acids. In one aspect, the polyol fatty acid ester-containing emulsion may contain other proteins, polysaccharides and/or lipids, including, but not limited to, milk proteins (e.g., casein, whey protein and the like), gelatins, soy protein isolates, starches, acetylated polysaccharides, alginates, carrageenans, chitosans, inulins, long chain fatty acids, waxes and combinations thereof.

In embodiments, the polyol fatty acid ester emulsifiers as disclosed herein may be used to carry coatings or other chemicals used for paper manufacturing including, but not limited to, agalite, esters, diesters, ethers, ketones, amides, nitriles, aromatics (e.g., xylenes, toluenes), acid halides, anhydrides, talc, alkyl ketene dimer (AKD), alabaster, alganic acid, alum, albarine, glues, barium carbonate, barium sulfate, precipitated calcium carbonate, ground calcium carbonate, titanium dioxide, clays, dolomite, diethylene triamine penta acetate, ethylene diamine tetraacetic acid (EDTA), enzymes, formamidine sulfuric acid, guar gum, gypsum, lime, magnesium bisulfate, milk of lime, milk of magnesia, PvOH, rosins, rosin soaps, satins, soaps/fatty acids, sodium bisulfate, soda ash, titania, surfactants, starches, modified starches, hydrocarbon resins, polymers, waxes, polysaccharides, proteins and combinations thereof.

In embodiments, the cellulose-containing material generated by the methods as disclosed herein exhibits greater hydrophobicity or water-resistance relative to that cellulose-containing material without the treatment. In a related aspect, the treated cellulose-containing material exhibits greater lipophobicity or grease resistance relative to the cellulose-containing material without the treatment. In a further related aspect, the treated cellulose-containing material may be biodegradable, compostable, and/or recyclable. In one aspect, the treated cellulose-containing material is hydrophobic (water resistant) and lipophobic (grease resistant).

In embodiments, the treated cellulose-containing material may have improved mechanical properties compared to that same material untreated. For example, paper bags treated by the process as disclosed herein show increased burst strength, Gurley number, tensile strength and/or energy of maximum load. In one aspect, the burst strength is increased by a factor of between about 0.5 to 1.0 fold, between about 1.0 and 1.1 fold, between about 1.1 and 1.3 fold, between about 1.3 to 1.5 fold. In another aspect, the Gurley number increased by a factor of between about 3 to 4 fold, between about 4 to 5 fold, between about 5 to 6 fold and about 6 to 7 fold. In another aspect, the tensile strain or strength increased by a factor of between about 0.5 to 1.0 fold, between about 1.0 to 1.1 fold, between about 1.1 to 1.2 fold and between about 1.2 to 1.3 fold. In another aspect, the energy of max load increased by a factor of between about 1.0 to 1.1 fold, between about 1.1 to 1.2 fold, between about 1.2 to 1.3 fold, and between about 1.3 to 1.4 fold.

In embodiments, the cellulose-containing material is a base paper comprising microfibrillated cellulose (MFC) or cellulose nanofiber (CNF) as described, for example, in U.S. Pub. No. 2015/0167243 (herein incorporated by reference in entirety), where the MFC or CNF is added during the forming process and paper making process and/or is added as a coating or a secondary layer to a prior forming layer to decrease the porosity of said base paper. In a related aspect, the base paper is contacted with the polyol fatty acid ester as described above. In a further related aspect, the contacted base paper is further contacted with a PvOH. In embodiments, the resulting contacted base paper is tuneably water and lipid resistant. In a related aspect, the resulting base paper may exhibit a Gurley value of at least about 10-15 (i.e., Gurley air resistance (sec/100 cc, 20 oz. cyl.)), or at least about 100, at least about 200 to about 350. In one aspect, the prolamine-polyol fatty acid ester coating may be a laminate for one or more layers or may provide one or more layers as a laminate or may reduce the amount of coating of one or more layers to achieve the same performance effect (e.g., water resistance, grease resistance and the like). In a related aspect, the laminate may comprise a biodegradable and/or compostable heat seal or adhesive.

In embodiments, the polyol fatty acid esters may be formulated as emulsions, where the choice of emulsifying agent and the amount employed are dictated by the nature of the composition and the ability of the agent to facilitate dispersion of the polyol fatty acid ester. In one aspect, the emulsifying agent may include, but is not limited to, water, buffers, PvOH, carboxymethyl cellulose (CMC), milk proteins, wheat glutens, gelatins, soy protein isolates, starches, acetylated polysaccharides, alginates, carrageenans, chitosans, inulins, long chain fatty acids, waxes, agar, alginates, glycerol, gums, lecithins, poloxamers, mono-glycerols, diglycerols, monosodium phosphates, monostearate, propylene glycols, detergents, cetyl alcohol, and combinations thereof. In an aspect, the polyol ester:emulsifying agent ratios may be from about 0.1:99.9, from about 1:99, from about 10:90, from about 20:80, from about 35:65, from about 40:60 or from about 50:50. It will be apparent to one of skill in the art that ratios may be varied depending on the property(ies) desired for the final product.

In embodiments, the prolamine-polyol fatty acid esters coatings may be combined with one or more components for internal and surface sizing (alone or in combination), including but not limited to, pigments (e.g., clay, calcium carbonate, titanium dioxide, plastic pigment), binders (e.g., starch, soy protein, polymer emulsions, PvOH) and additives (e.g., glyoxal, glyoxalated resins, zirconium salts, calcium stearate, calcium carbonates, lecithin oleate, polyethylene emulsion, carboxymethyl cellulose, acrylic polymers, alginates, polyacrylate gums, polyacrylates, microbiocides, oil-based defoamers, silicone-based defoamers, stilbenes, direct dyes and acid dyes). In a related aspect, such components may provide one or more properties, including but not limited to, building a fine porous structure, providing light scattering surface, improving ink receptivity, improving gloss, binding pigment particles, binding coatings to paper, base sheet reinforcement, filling pores in pigment structure, reducing water sensitivity, resisting wet pick in offset printing, preventing blade scratching, improving gloss in supercalendering, reducing dusting, adjusting coating viscosity, providing water holding, dispersing pigments, maintaining coating dispersion, preventing spoilage of coating/coating color, controlling foaming, reducing entrained air and coating craters, increasing whiteness and brightness, and controlling color and shade. It will be apparent to one of skill in the art that combinations may be varied depending on the property (ies) desired for the final product.

In embodiments, the methods employing said prolamine-polyol fatty acid esters may be used to lower the cost of applying a primary/secondary coating (e.g., a silicone-based layer, starch-based layer, clay-based layer, PLA layer, PEI layer and the like) by providing a layer of material that exhibits a necessary property (e.g., oil and/or grease resistance, water resistance, low surface energy, high surface energy and the like), thereby reducing the amount of primary/secondary layer necessary to achieve that same property. In one aspect, materials may be coated on top of a PFAE layer (e.g., heat sealable agents). In embodiments, the composition is fluorocarbon free and silicone free.

In embodiments, the compositions increase both mechanical and thermal stability of the treated product. In one aspect, the surface treatment is thermostable at temperatures between about −100° C. to about 300° C. In an aspect, the surface of the cellulose-based material exhibits a water contact angle of between about 60° to about 120°. In an aspect, the surface treatment is chemically stable at temperatures of between about 200° C. to about 300° C.

The substrate to which the prolamine/PFAE composition is added, which may be dried prior to application (e.g., at about 80-150° C.), may be treated with the modifying composition by dipping, for example, and allowing the surface to be exposed to the composition for less than 1 second. The substrate may be heated to dry the surface, after which the modified material is ready for use. In an aspect, according to the method as disclosed herein, the substrate may be treated by any suitable coating/sizing process typically carried out in a paper mill (see, e.g., Smook, G., "Surface Treatments," in, "Handbook for Pulp & Paper Technologists," (2016), 4$^{th}$ Ed., Chap. 18, pp. 293-309, TAPPI Press, Peachtree Corners, Ga. USA, herein incorporated by reference in entirety).

No special preparation of the material is necessary in practicing the invention, although for some applications, the material may be dried before treatment. In embodiments, the methods as disclosed may be used on any cellulose-based surface, including, but not limited to, a film, a rigid container, fibers, pulp, a fabric or the like. In one aspect, the prolamine/polyol fatty acid esters or coating agents may be applied by conventional size press (vertical, inclined, horizontal), gate roll size press, metering size press, calendar size application, tube sizing, on-machine, off-machine, single-sided coater, double-sided coater, short dwell, simultaneous two-side coater, blade or rod coater, gravure coater, gravure printing, flexographic printing, ink-jet printing, laser printing, supercalendaring and combinations thereof.

Depending on the source, the cellulose may be paper, paperboard, pulp, softwood fiber, hardwood fiber or combinations thereof, nanocellulose, cellulose nanofibres, whiskers or microfibril, microfibrillated, cotton or cotton blends, cellulose nanocrystals or nanofibrilated cellulose.

In embodiments, the amount of prolamine-polyol fatty acid ester coating applied is sufficient to completely cover at least one surface of a cellulose-containing material. For example, in embodiments, the prolamine-polyol fatty acid ester coating may be applied to the complete outer surface of a container, the complete inner surface of a container or a combination thereof, or on one or both sides of a base paper. In embodiments, the complete upper surface of a film may be covered by the prolamine-polyol fatty acid ester coating, or the complete under surface of a film may be covered by the prolamine-polyol fatty acid ester coating, or both sides are covered. In embodiments, the lumen of a device/instrument may be covered by the coating or the outer surface of the device/instrument may be covered by the prolamine-polyol fatty acid ester coating or both outer and inner surfaces are covered. In embodiment, the amount of prolamine-polyol fatty acid ester coating applied is sufficient to partially cover at least one surface of a cellulose-containing material. For example, only those surfaces exposed to the ambient atmosphere or to a product, composition, compound or material in a targeted end use are covered by the prolamine-polyol fatty acid ester coating, or only those surfaces that are not exposed to the ambient atmosphere are covered by the prolamine-polyol fatty acid ester coating (e.g., masking). As will be apparent to one of skill in the art, the amount of prolamine-polyol fatty acid ester coating applied may be dependent on use of the material to be covered. In one aspect, one surface may be coated with a prolamine-polyol fatty acid ester (prolamine-PFAE) and the opposing surface may be coated with an agent including, but not limited to, proteins, wheat glutens, gelatins, soy protein isolates, starches, modified starches, acetylated polysaccharides, alginates, carrageenans, chitosans, inulins, long chain fatty acids, waxes, and combinations thereof. In an aspect, the prolamine-PFAE can be added to a furnish, and the resulting material on the web may be provided with an additional coating of PFAE or prolamine-PFAE.

Any suitable coating process may be used to deliver any of the various prolamine-polyol fatty acid ester coatings and/or emulsions applied in the course of practicing that aspect of the method. In embodiments, prolamine-polyol fatty acid ester coating processes include immersion, spraying, painting, printing and any combination of any of those processes, alone or with other coating processes adapted for practicing the methods as disclosed.

By increasing the concentration of polyol fatty acid ester, for example, the prolamines as disclosed herein more readily dissolve and form a more uniform film. In one aspect, various catalysts might allow for more rapid, "curing," of the coating to precisely tune the nature (composition) of or the quantity of prolamine:polyol fatty acid ester to meet specific applications.

It will be apparent to one of skill in the art that the selection of cellulose to be treated, the prolamine-polyol fatty acid ester coating, the reaction temperature and the exposure time are parameters that are optimized by routine experimentation to suit any particular application for the final product.

In embodiments, the prolamine is zein. Zein may be purchased commercially (see above) or made by the methods as described in Lawton J W, Cereal Chem (2002) 79(1): 1-18, at pages 1-4 (herein incorporated by reference in entirety).

The derivatized materials have altered physical properties which may be defined and measured using appropriate tests known in the art. For hydrophobicity, the analytical protocol may include, but is not limited to, contact angle measurement and moisture pick-up. Other properties include, stiffness, water vapor transmission rate (WVTR), porosity, tensile strength, lack of substrate degradation, burst and tear properties. A specific standardized protocol to follow is defined by the American Society for Testing and Materials (protocol ASTM D7334-08).

Permeability of a surface to various gases, such as, water vapour and oxygen, may also be altered by the polyol fatty acid ester coating process as the barrier function of the material is enhanced. The standard unit measuring permeability is the Barrer and protocols to measure those parameters are also available in the public domain (ASTM std F2476-05 for water vapour and ASTM std F2622-8 for oxygen).

In embodiments, biodegradable materials treated according to the presently disclosed procedure display a complete biodegradability as measured by degradation in the environment under microbial attack.

Various methods are available to define and to test biodegradability, including the shake-flask method (ASTM E1279-89(2008)) and the Zahn-Wellens test (OECD TG 302 B).

Various methods are available to define and to test compostability including, but not limited to, ASTM D6400.

In embodiments, the barrier coating composition as disclosed herein, when applied to a substrate or a surface, produces an article having resistance to oil and/or grease penetration. Resistance to oil and/or grease penetration includes resistance to penetration by various oils, greases, waxes, other oily substances and surprisingly highly penetrating solvents, such as, toluene and heptane. The resistance to oil and/or grease penetration may be measured by the 3M Kit Test. In one aspect, the composition has a Kit number of at least 3, at least 5, at least 7, at least 9.

In embodiments, methods of producing an article are disclosed comprises applying the barrier coating composition to a substrate to produce the article which has high surface energy and resistance to oil and/or grease penetration. In a related aspect, the barrier composition is provided in intimate contact with one or more surfaces of the substrate to provide penetration resistance to those surfaces. In an aspect, the barrier coating may be applied as a coating on the one or more surfaces, or in applications, the coating may be applied such that it is absorbed into the interior of the substrate and contacts more surfaces.

In embodiments, the barrier composition is applied as a coating on the substrate. The substrate may be coated with the composition by any suitable method, for example, by rolling, spreading, spraying, brushing or pouring processes, followed by drying; by co-extruding the barrier composition with other materials onto a preformed substrate; or by melt/extrusion coating a preformed substrate. In an aspect, the coating may be applied by a size press. In an aspect, the substrate may be coated on one side, on both sides or on all sides with the barrier composition. In an aspect, a coating knife, such as, a, "doctor blade," which allows uniform spreading of the barrier composition onto a substrate that is moved along by rollers, may be used. In an aspect, the barrier coating may be applied to textiles, non-wovens, foil, paper, paperboard and other sheet materials by continuously operating spread-coating machines.

The barrier compositions as disclosed herein may be used to produce a wide variety of different articles having resistance to oil and/or grease penetration. The articles may include, but are not limited to, paper, paperboard, cardboard, containerboard, gypsum board, wood, wood composites, furniture, masonry, leather, automobile finishes, furniture polishes, plastics, non-stick cookware and foams.

In embodiments, the barrier compositions as disclosed herein may be used in food packaging papers and paperboard, including fast food packaging. Specific examples of food packaging uses include fast food wrappers, food bags, snack bags, grocery bags, cups, trays, cartons, boxes, bottles, crates, food packaging films, blister pack wrappers, microwavable popcorn bags, release papers, pet food containers, beverage containers, OGR papers and the like. In embodiments, textile articles may be produced, such as, natural textile fibers or synthetic textile fibers. In a related aspect, the textile fibers may be further processed into garments, linens, carpets, draperies, wall-coverings, upholstery and the like.

In embodiments, substrates may be formed into articles prior to or after applying the barrier composition of interest. In an aspect, containers may be produced from flat, coated paperboard by press-forming, by vacuum forming or by folding and adhering paperboard into the final desired shape. Coated, flat paperboard stock may be formed into trays by application of heat and pressure, as disclosed in, for example, U.S. Pat. No. 4,900,594 (incorporated herein by reference in entirety), or vacuum formed into containers for foods and beverages, as disclosed in U.S. Pat. No. 5,294,483 (incorporated herein by reference in entirety).

Materials suitable for treatment by the process of the invention include various forms of cellulose, such as, cotton fibers, plant fibers, such as, flax, wood fibers, regenerated cellulose (rayon and cellophane), partially alkylated cellulose (cellulose ethers), partially esterified cellulose (acetate rayon) and other modified cellulose materials which have a substantial portion of surfaces available for reaction/binding. As stated above, the term, "cellulose," includes all of those materials and others of similar polyol structure and having similar properties. Among those the relatively novel material microfibrillated cellulose (cellulose nanofiber) (see e.g., U.S. Pat. No. 4,374,702 and US Pub. Nos. 2015/0167243 and 2009/0221812, each herein incorporated by reference in entirety) is particularly suitable in practice of the subject matter of interest. In embodiments, celluloses may include, but not limited to, cellulose triacetate, cellulose propionate, cellulose acetate propionate, cellulose acetate butyrate, nitrocellulose (cellulose nitrate), cellulose sulfate, celluloid, methylcellulose, ethylcellulose, ethyl methyl cellulose, hydroxyethyl cellulose, hydroxypropyl cellulose, cellulose nanocrystals, hydroxyethyl methyl cellulose, hydroxypropyl methyl cellulose, ethyl hydroxyethyl cellulose, carboxymethyl cellulose and combinations thereof.

Modification of cellulose with the barrier coating as disclosed herein, in addition to increasing resistance to oil and/or grease, may also increase tensile strength, flexibility and stiffness, thereby further widening the range of uses. All biodegradable and partially biodegradable products made from or by using the modified cellulose disclosed herein are within the scope of the disclosure, including recyclable and compostable products.

Among the possible applications of the coating technology, such items include, but are not limited to, containers for all purposes, such as, paper, paperboard, paper pulp, cups, lids, boxes, trays, release papers/liners, compost bags, shopping bags, pipes and water conduits, food grade disposable cutlery, plates and bottles, screens for television and mobile devices, clothing (e.g., cotton or cotton blends), bandages, pressure sensitive labels, pressure sensitive tape, feminine products, and medical devices, such as contraceptives, drug delivery devices and the like. Also, the coating technology as disclosed herein may be used on furniture and upholstery, outdoor camping equipment and the like.

The following examples are intended to illustrate but not to limit the invention.

EXAMPLES

Example 1. Saccharide Fatty Acid Ester Formulations

SEFOSE® is a liquid at room temperature and all coatings/emulsions containing that material were applied at room temperature using a bench top drawdown device. Rod type and size were varied to create a range of coat weights.
Formulation 1

Fifty ml of SEFOSE® were added to a solution containing 195 ml of water and 5 grams of carboxymethylcellulose (FINNFIX® 10; CP Kelco, Atlanta, Ga.). The formulation was mixed using a Silverson Homogenizer set to 5000 rpm for 1 minute. The emulsion was coated on a 50 gram base sheet made of bleached hardwood pulp and on an 80 gram sheet composed of unbleached softwood. Both papers were placed into an oven (105° C.) for 15 minutes to dry. On removal from the oven, sheets were placed on the lab bench and 10 drops of water (room temperature) were applied via pipette to each sheet. Untreated base sheets absorb a droplet of water immediately, whereas sheets coated with varying amounts of SEFOSE® showed increasing levels of water resistance as coat weight increased (see Table 1).

TABLE 1

Base Sheet Results with SEFOSE ®

| Coat weight g/m² | 50 g Hardwood Base Water Holdout (minutes) | 80 g Softwood Base Holdout (minutes) |
|---|---|---|
| 3.2 | 1 | 0.5 |
| 4.1 | 14 | 9 |
| 6.4 | 30 | 25 |
| 8.5 | 50 | 40 |
| 9.2 | 100+ | 100+ |

It was observed that water resistance was not as pronounced in the heavier sheet and no water resistance was achieved unless the sheet was dry.

Formulation 2

Addition of SEFOSE® to cup stock: (a single layer stock with no MFC treatment) (110 gram board made of Eucalyptus pulp). Fifty grams of SEFOSE® were added to 200 grams of 5% cooked ethylated starch (Ethylex 2025) and stirred using a bench top kady mill for 30 seconds. Paper samples were coated and placed in the oven at 105° C. for 15 minutes. Test droplets (10-15) were placed on the coated side of the board and water holdout time was measured and recorded in the table below. Water penetration on the untreated board control was instant (see Table 2).

TABLE 2

Penetration of Hot Water for SEFOSE ® Treated Cup Stock

| Quantity Applied g/m² | Time Required for Hot (80° C.) Water to Penetrate |
|---|---|
| 2.3 | 0.05 hr |
| 4.1 | 0.5 hr |
| 6.2 | 1.2 hr |
| 8.3 | 3.5 hr |
| 9.6 | ~16 hr |

Formulation 3

Pure SEFOSE® was warmed to 45° C. and placed in a spray bottle. A uniform spray was applied to the paper stock of the previous example, as well as to a piece of fiberboard and an amount of cotton cloth. When water drops were placed on the samples, penetration into the substrate occurred within 30 seconds. However, after drying in the oven for 15 minutes at 105° C., beads of water evaporated before being absorbed into the substrate.

Continued investigation concerned whether SEFOSE® might be compatible with compounds used for oil and/or grease resistant coatings. SEFOSE® is useful for water resistance as well as stiffness improvements. Board stock (240 g) was used for stiffness tests. Table 3 shows the results. The data were obtained at a single coat weight: 5 grams/square meter with a 5 sample average being reported. Results are in Taber stiffness units recorded with a V-5 Taber stiffness tester Model 150-E.

TABLE 3

Stiffness Test

| Sample tested | Machine Direction Stiffness | Cross Direction Stiffness |
|---|---|---|
| Control board - no coating | 77.6 | 51.8 |
| SEFOSE ® | 85.9 | 57.6 |
| Erucic Acid | 57.9 | 47.4 |
| Palmitoyl chloride | 47.7 | 39.5 |

Example 2. Bonding of Saccharide Ester to Cellulosic Substrate

In an effort to determine whether SEFOSE® was reversibly bound to a cellulosic material, pure SEFOSE® was mixed with pure cellulose at ratio of 50:50. The SEFOSE® was allowed to react for 15 min at 300° F. and the mixture was extracted with methylene chloride (non-polar solvent) or distilled water. The samples were refluxed for 6 hours and gravimetric analysis of the samples was conducted.

TABLE 4

Extraction of SEFOSE ® from Cellulosic Material

| Sample | Total Mass | SEFOSE ® Mass | SEFOSE ® Extracted | % SEFOSE ® Retained |
|---|---|---|---|---|
| $CH_2Cl_2$ | 2.85 | 1.42 | 0.25 | 83% |
| $H_2O$ | 2.28 | 1.14 | 0.08 | 93% |

Example 3. Examination of Cellulosic Surfaces

Figure 2:
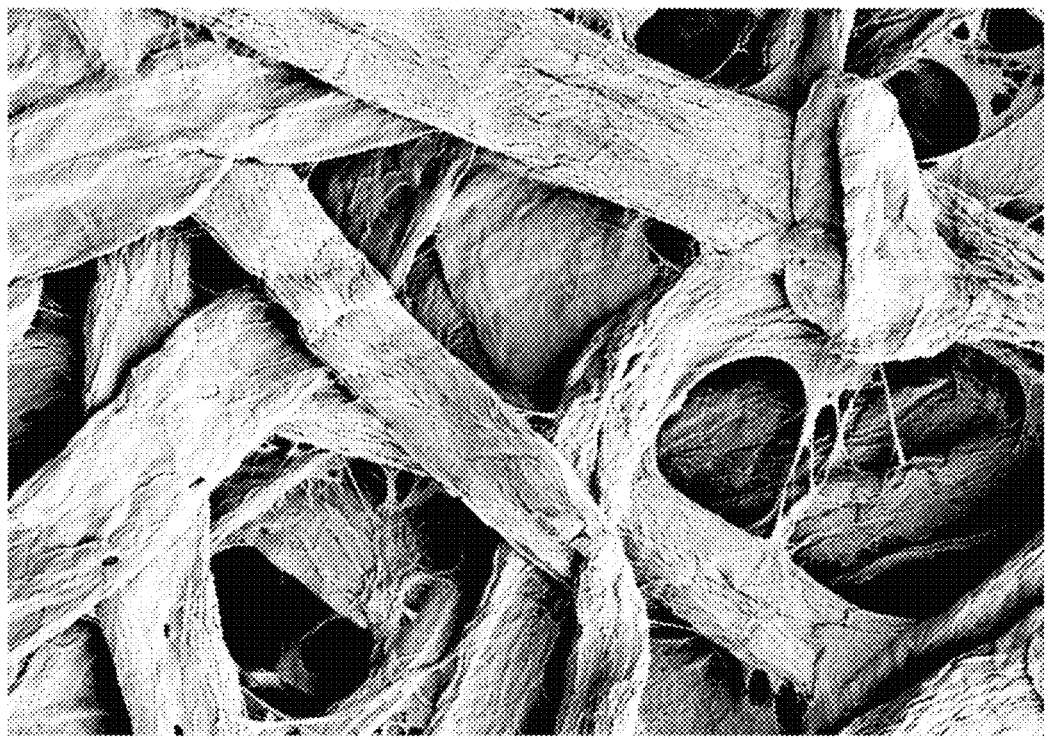
FIG. 2 shows an SEM of untreated, medium porosity Whatman Filter Paper (1070× magnification).
Figure 3:
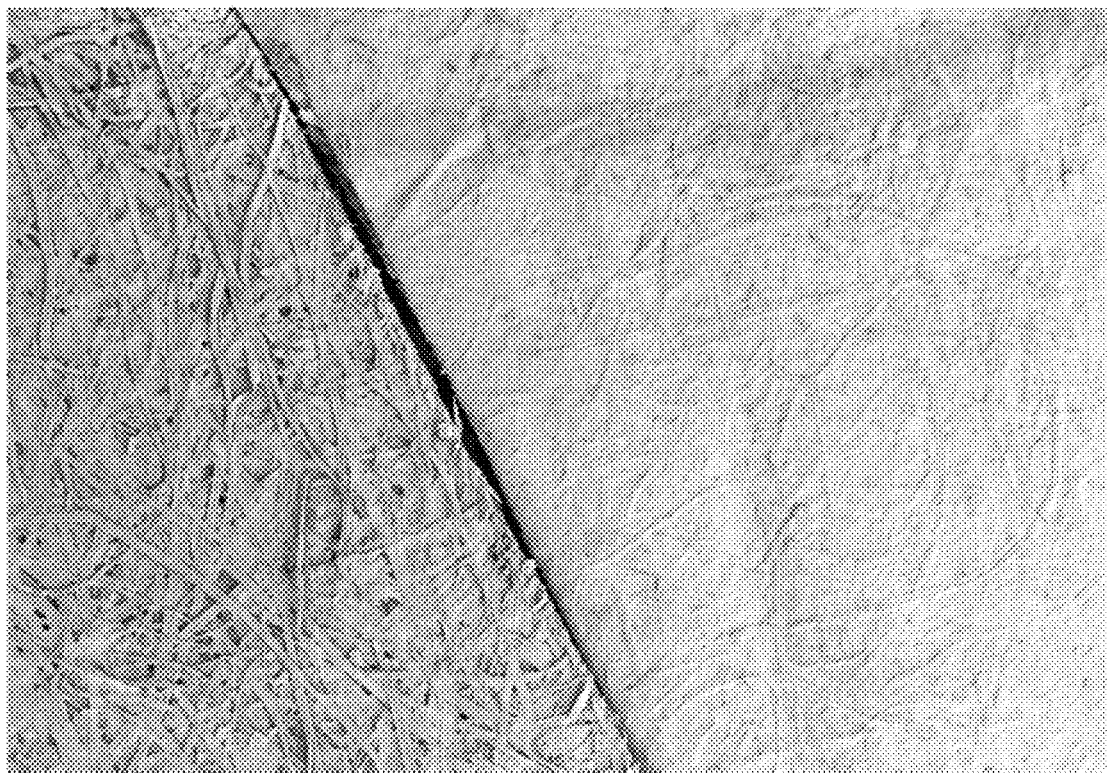
FIG. 3 shows a side-by-side comparison of SEM's of paper made from recycled pulp before (left) and after (right) coating with microfibrillated cellulose (MFC) (27× magnification).
Figure 4:
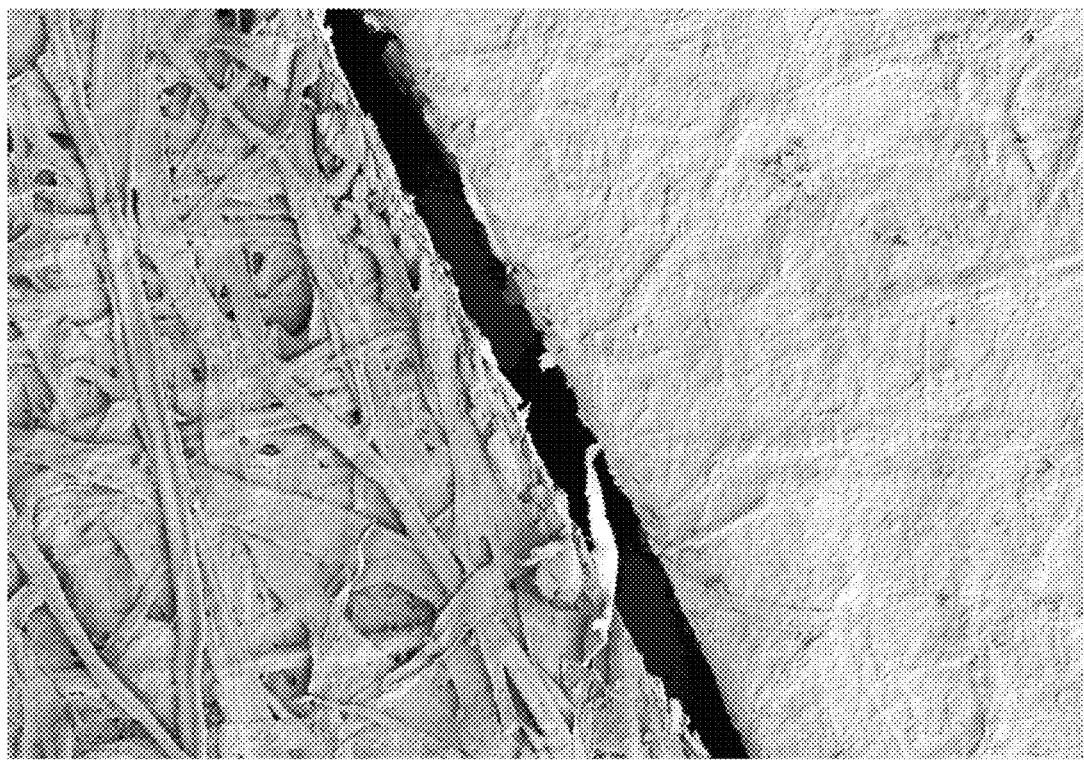
FIG. 4 shows a side-by-side comparison of SEM's of paper made from recycled pulp before (left) and after (right) coating with MFC (98× magnification).

Scanning electron microscope images of base papers with and without MFC illustrate how a less porous base has potential to require far less waterproofing agents reacted to the surface. FIGS. 1-2 show untreated, medium porosity Whatman filter paper. FIGS. 1 and 2 show the relative high surface area exposed with which a derivatizing agent can react. However, a highly porous sheet with plenty of room for water to escape is revealed. FIGS. 3 and 4 show a side by side comparison of paper made with recycled pulp before and after coating with MFC. (There are two magnifications of the same samples, no MCF on the left side of image). The testing shows that derivatization of a much less porous sheet shows more promise for long term water/vapor barrier performance. The last two images are close ups taken of an average, "pore," in a sheet of filter paper as well as a similar magnification of CNF-coated paper for contrast and comparison.

The data above demonstrate a critical point, addition of more material results in a corresponding increase in performance. While not being bound by theory, the reaction appears to be faster with unbleached papers, suggesting that the presence of lignin may speed the reaction.

Liquid SEFOSE® can readily be emulsified. Hence, such a liquid can be adapted to work in coating equipment commonly used in paper mills.

Example 4. "Phluphi"

Liquid SEFOSE® was mixed and reacted with bleached hardwood fiber to generate a variety of ways to create a waterproof handsheet. When the sucrose ester was mixed with pulp prior to sheet formation, the majority of the PFAE was retained with the fiber. With sufficient heating and drying, a brittle, fluffy but hydrophobic handsheet was formed. In that example, 0.25 grams SEFOSE® were mixed with 4.0 grams bleached hardwood fiber in 6 liters of water. The mixture was stirred by hand and the water drained in a standard handsheet mold. The resulting fiber mat was removed and dried for 15 minutes at 325° F. The produced sheet exhibited significant hydrophobicity as well as greatly reduced hydrogen bonding between the fibers. (Water contact angle was observed to be greater than 100°.) An emulsifier may be added. SEFOSE® to fiber may be from about 1:100 to 2:1.

Subsequent testing shows that talc is only a spectator in the process and was left out of additional testing.

Example 5. Environmental Effects on SEFOSE® Coating Properties

To better understand the mechanism of sucrose esters reaction with fiber, low viscosity coatings were applied to a bleached kraft sheet that had wet strength resin added, but no water resistance (no sizing). Coating viscosity was measured using a Brookfield Viscometer at 100 rpm.

Figure 5:
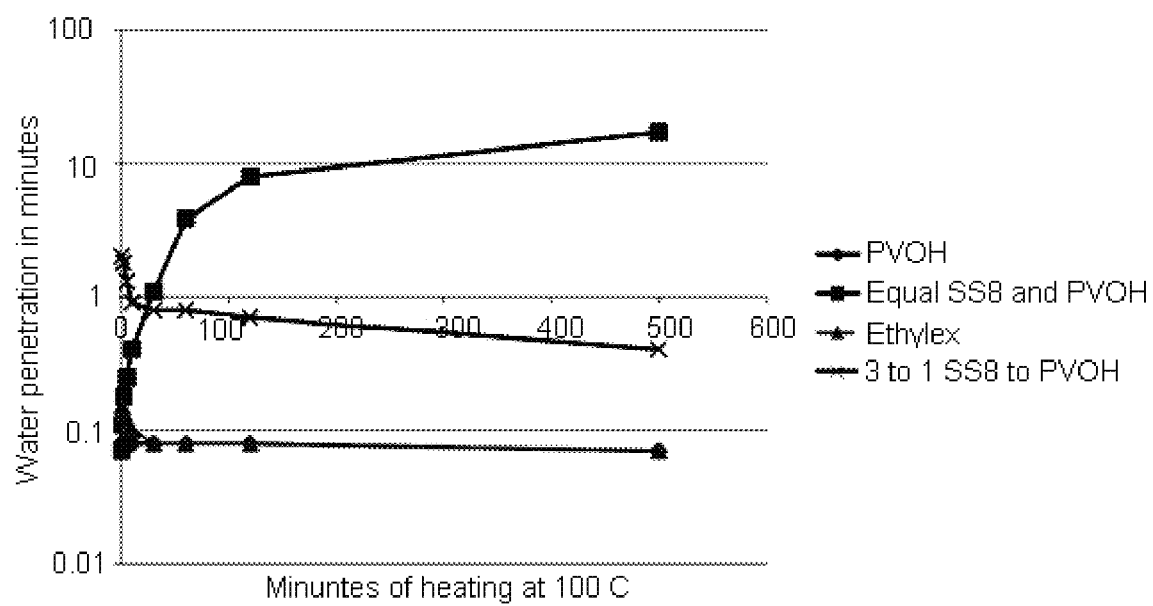
FIG. 5 shows water penetration in paper treated with various coating formulations: polyvinyl alcohol (PvOH), diamonds; SEFOSE®+PvOH at 1:1 (v/v), squares; Ethylex (starch), triangles; SEFOSE®+PvOH at 3:1 (v/v), crosses.

SEFOSE® was emulsified with Ethylex 2025 (ethylated starch) and applied to the paper via a gravure roll. For comparison, SEFOSE® was also emulsified with Westcote 9050 PvOH. As shown in FIG. 5, oxidation of the double bonds in SEFOSE® is enhanced by the presence of heat and additional chemical environments that enhance oxidative chemistry (see also, Table 5).

TABLE 5

Environmental Effects on SEFOSE ® (Minutes to Failure)

| | SEFOSE ® | | | |
| --- | --- | --- | --- | --- |
| Time | PVOH | −PVOH | Ethylex | 3:1 |
| 0 | 0.08 | 0.07 | 0.15 | 2 |
| 1 | 0.083 | 0.11 | 0.15 | 1.8 |
| 2 | 0.08 | 0.18 | 0.13 | 1.8 |
| 5 | 0.09 | 0.25 | 0.1 | 1.3 |
| 10 | 0.08 | 0.4 | 0.1 | 0.9 |
| 30 | 0.08 | 1.1 | 0.08 | 0.8 |
| 60 | 0.08 | 3.8 | 0.08 | 0.8 |
| 120 | 0.08 | 8 | 0.08 | 0.7 |
| 500 | 0.07 | 17 | 0.07 | 0.4 |

Example 6. Effect of Unsaturated vs. Saturated Fatty Acid Chains

SEFOSE® was reacted with bleached softwood pulp and dried to form a sheet. Subsequently, extractions were carried out with $CH_2Cl_2$, toluene and water to determine the extent of the reaction with pulp. Extractions were performed for at least 6 hours using Soxhlet extraction glassware. Results of the extractions are shown in Table 6.

TABLE 6

Extraction of SEFOSE ®-bound Pulp

| | Water | $CH_2Cl_2$ | Toluene |
| --- | --- | --- | --- |
| Mass of Dry Pulp | 8.772 g | 9.237 g | 8.090 g |
| SEFOSE ® added | 0.85 g | 0.965 g | 0.798 g |
| Amount Extracted | 0.007 g | 0.015 g | 0.020 g |

The data indicate that essentially all of the SEFOSE® remains in the sheet. The same procedure was carried out on the pulp alone, and results show that approximately 0.01 g per 10 g of pulp were obtained. While not being bound by theory, that could be accounted for as residual pulping chemicals or more likely extractives that had not been completely removed.

Pure fibers of cellulose (e.g., α-cellulose from Sigma Aldrich, St. Louis, Mo.) were used, and the experiment repeated. As long as the loading levels of SEFOSE® remained below about 20% of the mass of the fibers, over 95% of the mass of SEFOSE® was retained with the fibers and was not extractable with either polar or non-polar solvents. While not being bound by theory, optimizing baking time and temperature may further enhance the sucrose esters remaining with the fibers.

As shown, the data demonstrate a general inability to extract SEFOSE® out of the material after drying. On the other hand, when the fatty acids of the PFAE were all saturated fatty acid chains, OLEAN®, available from Procter & Gamble Chemicals (Cincinnati, Ohio), nearly 100% of the of the material can be extracted using hot water (at or above 70° C.). OLEAN® is identical to SEFOSE® with the only change being saturated fatty acids are attached (OLEAN®) to the sucrose instead of unsaturated fatty acids (SEFOSE®).

Another noteworthy aspect is that multiple fatty acid chains are reactive with the cellulose, and with the two saccharide molecules in the structure, SEFOSE® gives rise to a stiff crosslinking network leading to strength improvements in fibrous webs, such as, paper, paperboard, air-laid and wet-laid non-wovens, and textiles.

Example 7. SEFOSE® Additions to Achieve Water Resistance

Two and 3 gram handsheets were made using both hardwood and softwood kraft pulps. When SEFOSE® was added to the 1% pulp slurry at a level of 0.1% or greater and water was drained forming the handsheet, SEFOSE® was retained with the fibers, imparting water resistance. From 0.1% to 0.4% SEFOSE®, water beaded on the surface for a few seconds or less. After SEFOSE® loading went above 0.4%, the time of water resistance quickly increased to minutes and then to hours for loading levels greater than 1.5%.

Example 8. Production of Bulky Fibrous Material

Addition of SEFOSE® to pulp acts to soften the fibers, increase space between the fibers, increasing bulk. For example, a 3% slurry of hardwood pulp containing 125 g (dry) of pulp was drained, dried and found to occupy a volume of 18.2 cubic centimeters. When 12.5 g of SEFOSE® were added to the same 3% hardwood pulp slurry that contained an equivalent of 125 g dry fiber, on draining the water and drying, the resulting mat occupied 45.2 cubic centimeters.

Thirty grams of a standard bleached hardwood kraft pulp (Old Town Fuel and Fiber, LLC, Old Town, Me.) were sprayed with SEFOSE® that had been warmed to 60° C. About 4.3 $cm^3$ were placed in a disintegrator for 10,000 rpm and essentially repulped. The mixture was poured through a handsheet mold and dried at 105° C. The resulting hydrophobic pulp occupied a volume of 8.1 $cm^3$. A 2-inch square of that material was cut and placed in a hydraulic press with 50 tons of pressure applied for 30 seconds. The volume of the square was reduced significantly but still occupied 50% more volume than the same 2-inch square cut for the control with no pressure applied.

It is significant that not only is an increase in bulk and softness observed, but that a forcibly repulped mat after the water was drained resulted in a fiber mat where all of the hydrophobicity was retained. That quality, in addition to the observations that water cannot be easily, "pushed," past the low surface energy barrier into the sheet, is of value. Attachment of hydrophobic single chains of fatty acids do not exhibit that property.

While not being bound by theory, that represents additional evidence that SEFOSE® is reacting with the cellulose and that the OH groups on the surface of the cellulose fibers are no longer available to participate in subsequent hydrogen bonding. Other hydrophobic materials interfere with initial hydrogen bonding, but on repulping that effect is reversed and the OH groups on the cellulose are free to participate in hydrogen bonding on redrying.

Example 9. Bag Paper Testing Data

The following table (Table 7) illustrates properties imparted by coating at 5-7 $g/m^2$ with SEFOSE® and PvOH mixture on an unbleached kraft bag stock (control). Also included for reference are commercial bags.

TABLE 7

Bag Paper Tests

| Paper Type | Caliper (0.001 in) | Tensile (lb/in$^2$) | Burst (psi) |
| --- | --- | --- | --- |
| Trial bag (control) | 3.26 | 9.45 | 52.1 |
| Trial bag with SEFOSE ® | 3.32 | 15.21 | 62.6 |
| Sub Sandwich bag | 2.16 | 8.82 | 25.2 |
| Home Depot leaf bag | 5.3 | 17.88 | 71.5 |

As may be seen in Table 7, tensile and burst increase with coating of the control base paper with SEFOSE® and PvOH.

Example 10. Wet/Dry Tensile Strength

Three gram handsheets were made from bleached pulp. The following data compares wet and dry tensile strength at different levels of SEFOSE® addition. Note that with those handsheets, SEFOSE® was not emulsified into any coating but was simply mixed into the pulp and drained with no other chemistry added (see Table 8).

TABLE 8

Wet/Dry Tensile Strength

| SEFOSE ® Loading | Wet Strength (lb/in$^2$) | Dry Strength (lb/in$^2$) |
| --- | --- | --- |
| 0% | 0.29 | 9.69 |
| 0.5% | 1.01 | 10.54 |
| 1% | 1.45 | 11.13 |
| 5% | 7.22 | 15.02 |

Note also that the 5% addition rate yielded wet strength not far below the dry strength of the control.

Example 11. Use of Esters Containing Less than 8 Saturated Fatty Acids

A number of experiments were conducted with sucrose esters produced having less than 8 fatty acids attached to the sucrose moiety. Samples of SP50, SP10, SP01 and F20W (Sisterna, The Netherlands) contain 50, 10, 1 and essentially 0% monoesters, respectively. While those commercially available products are made by reacting sucrose with saturated fatty acids, thus relegating the compounds less useful for further crosslinking or similar chemistries, the compounds are useful in examining emulsification and water repelling properties.

For example, 10 g of SP01 were mixed with 10 g of glyoxal in a 10% cooked PvOH solution. The mixture was, "cooked," at 200° F. for 5 mins and applied via drawdown to a porous base paper made from bleached hardwood kraft. The result was a crosslinked waxy coating on the surface of the paper that exhibited good hydrophobicity. Where a minimum of 3 g/m$^2$ were applied, the resulting contact angle was greater than 100°. Since glyoxal is a well-known crystallizer used on compounds having OH groups, that method is a potential means to affix fairly unreactive sucrose esters to a surface by bonding leftover alcohol groups on the sucrose ring with an alcohol group made available in the substrate or other coating materials.

Example 12. HST Data and Moisture Uptake

To demonstrate that SEFOSE® alone provides the water proofing properties observed, porous Twins River (Matawaska, Me.) base paper was treated with various amounts of SEFOSE® (and PvOH or modified starch (Ethylex 2025) to emulsify, applied by drawdown) and assayed by Hercules size test. The results are shown in Table 9.

TABLE 9

HST Data with SEFOSE ®.

| HST-seconds | SEFOSE ® pickup g/m$^2$ | Emulsifier g/m$^2$ |
| --- | --- | --- |
| <1 | — | — |
| 2.7 | 0 g/m$^2$ | 2.7 g/m$^2$ PvOH |
| 16.8 | 0 g/m$^2$ | 4.5 g/m$^2$ Ethylex 2025 |
| 65 | 2.2 g/m$^2$ | 2.3 g/m$^2$ Ethylex 2025 |
| 389.7 | 1.6 g/m$^2$ | 1.6 g/m$^2$ PvOH |
| 533 | 3.0 g/m$^2$ | 4.0 g/m$^2$ PvOH |
| 1480 | 5.0 g/m$^2$ | 5.0 g/m$^2$ Ethylex 2025 |
| 2300+ | 5.0 g/m$^2$ | 5.0 g/m$^2$ PvOH |

As can be seen in Table 9, increased SEFOSE® applied to the surface of the paper lead to increased water resistance (as shown by increased HST in seconds).

That may also be seen using coatings of a saturated sucrose ester product. F20W (Sisterna, The Netherlands) is described as a very low % monoester with most molecules in the 4-8 substitution range. Note that the F20W product pickup is only 50% of the total coating which was emulsified with PvOH using equal parts of each to make a stable emulsion. So, where the pickup is labeled "0.5 g/m$^2$," there is also the same pickup of PvOH giving a total pickup of 1.0 g/m$^2$. Results are shown in Table 10.

TABLE 10

HST Data F20W.

| HST-Seconds | Sisterna F20W pickup |
| --- | --- |
| <1 | 0 |
| 2.0 | 0.5 g/m$^2$ |
| 17.8 | 1.7 g/m$^2$ |
| 175.3 | 2.2 g/m$^2$ |
| 438.8 | 3.5 g/m$^2$ |
| 2412 | 4.1 g/m$^2$ |

As can be seen from Table 10, again, increase in F20W increases the water resistance of the porous sheet. Thus, the applied sucrose fatty acid ester is making the paper water resistant.

That the water resistance is not simply due to the presence of a fatty acid forming an ester bond with the cellulose, softwood handsheets (bleached softwood kraft) were loaded with SEFOSE® and oleic acid directly added to the pulp, where the oleic acid forms an ester bond with the cellulose in the pulp. The mass at time zero represents the, "bone dry," mass of the handsheets taken out of the oven at 105° C. The samples were placed in a controlled humidity room maintained at 50% RH. The change in mass is noted over time (in minutes). The results are shown in Tables 11 and 12.

TABLE 11

Moisture Uptake SEFOSE ®.

| Time (Min) | 2% SEFOSE ® | 30% SEFOSE ® | Control |
|---|---|---|---|
| 0 | 3.859 | 4.099 | 3.877 |
| 1 | 3.896 | 4.128 | 3.911 |
| 3 | 3.912 | 4.169 | 3.95 |
| 5 | 3.961 | 4.195 | 3.978 |
| 10 | 4.01 | 4.256 | 4.032 |
| 15 | 4.039 | 4.276 | 4.054 |
| 30 | 4.06 | 4.316 | 4.092 |
| 60 | 4.068 | 4.334 | 4.102 |
| 180 | 4.069 | 4.336 | 4.115 |

TABLE 12

Moisture Uptake Oleic Acid.

| Time (hrs) | 30% Oleic Acid | 50% Oleic Acid | Control |
|---|---|---|---|
| 0 | 4.018 | 4.014 | 4.356 |
| 0.5 | 4.067 | 4.052 | 4.48 |
| 2 | 4.117 | 4.077 | 4.609 |
| 3 | 4.128 | 4.08 | 4.631 |
| 5 | 4.136 | 4.081 | 4.647 |
| 21 | 4.142 | 4.083 | 4.661 |

Note the difference where oleic acid is directly added to the pulp forming an ester bond greatly slows moisture uptake. In contrast, only 2% SEFOSE® slows moisture uptake, at higher concentrations, 30% SEFOSE® does not. As such, while not being bound by theory, the structure of the SEFOSE® bound material cannot be simply explained by the structure formed by simple fatty acid esters and cellulose.

Example 13. Saturated SFAE's

The saturated esters are waxy solids at room temperature which, due to saturation, are less reactive with the sample matrix or between/among molecules. Using elevated temperatures (e.g., at least 40° C. and for all those tested above 65° C.) the material melts and may be applied as a liquid which then cools and solidifies, forming a hydrophobic coating. Alternatively, the materials may be emulsified and applied as an aqueous coating to impart hydrophobic characteristics.

The data shown in Table 13 represent HST (Hercules size test) readings obtained from papers coated with varying quantities of saturated SFAE's.

A #45, bleached, hardwood kraft sheet obtained from Turner Falls paper was used for test coatings. The Gurley porosity measured approximately 300 seconds, representing a fairly tight base sheet. S-370 (DS of 3-5) obtained from Mitsubishi Foods (Japan) was emulsified with xanthan gum (up to 1% of the mass of saturated PFAE formulation) before coating.

Coat weight of the saturated PFAE formulation (pounds per ton) and HST (average of 4 measurements per sample) are presented in Table 13.

TABLE 13

| Coat weight of S-370 (pounds per ton) | HST (average of 4 measurements per sample) |
|---|---|
| Control only #0 | 4 seconds |
| #45 | 140 seconds |
| #65 | 385 seconds |
| #100 | 839 seconds |
| #150 | 1044 seconds |
| #200 | 1209 seconds |

The data support that limited amounts of saturated PFAE may enhance water resistance of coatings that are designed for other purposes/applications. For example, saturated PFAE was blended with Ethylex starch and PvOH-based coatings and increased water resistance was observed in each case.

The examples below were coated on a #50, bleached, recycled base with a Gurley porosity of 18 seconds.

One hundred grams of modified starch (Ethylex 2025) were cooked at 10% solids (1 liter volume) and 10 grams of S-370 were added hot and mixed using a Silverson homogenizer. The resulting coating was applied using a common benchtop drawdown device and the papers were dried under heat lamps.

At 300#/ton coat weight, the starch alone had an average HST of 480 seconds. With the same coat weight of the starch and saturated PFAE mixture, the HST increased to 710 seconds.

Enough PvOH (Selvol 205S) was dissolved in hot water to achieve a 10% solution. The solution was coated on the same #50 paper described above and had an average HST of 225 at 150 pounds/ton of coat weight. Using that same solution, S-370 was added to achieve a mixture which contained 90% PVOH/10% S-370 on a dry basis (i.e., 90 ml water, 9 grams PvOH, 1 gram S-370): and average HST increased to 380 seconds.

Certain cold insoluble polymers, such as, starch, are compatible with prolamines (such as, zein; see U.S. Pat. No. 7,737,200, herein incorporated by reference in entirety). Since one of the major barriers to commercial production of the subject matter of said patent is that the formulation be water soluble, addition of saturated PFAE's assists in that manner.

Example 14. Other Saturated SFAE's

Size press evaluations of saturated PFAE-based coatings were done on a bleached lightweight sheet (approx. 35 #) that had no sizing and relatively poor formation. All evaluations were done using Exceval HR 3010 PvOH cooked to emulsify the saturated PFAE. Enough saturated PFAE was added to account for 20% of the total solids. The focus was on evaluating the S-370 vs the C-1800 samples (available from Mitsubishi Foods, Japan). Both of those esters performed better than the control, some of the key data are shown in Table 14:

TABLE 14

| | Average HST | Kit Value |
|---|---|---|
| 10% polyvinyl alcohol alone | 38 sec. | 2 |
| PVOH with S-370 | 85 sec. | 3 |
| PVOH with C-1800 | 82 sec. | 5 |

Note that the saturated compounds appear to give an increase in kit, with both the S-370 and the C-1800 yielding about a 100% increase in HST.

Example 15. Wet Strength Additive

Laboratory testing has shown that the chemistry of the polyol esters can be tuned to achieve a variety of properties, including use as a wet strength additive. When the polyol esters are made by attaching saturated groups to each alcohol functionality on the sucrose (or other polyol), the result is a hydrophobic, waxy substance having low miscibility/solubility in water. The compounds may be added to cellulosic materials to impart water resistance either internally or as a coating. However; since the compounds are not chemically reacted to each other or to any part of the sample matrix, the compounds are susceptible to removal by solvents, heat and pressure.

Where waterproofing and higher levels of water resistance are desired, polyol esters containing unsaturated functional groups may be made and added to the cellulosic material with the goal of achieving oxidation and/or crosslinking which helps fix the sucrose ester in the matrix and to render the ester resistant to removal by physical means. By tuning the number of unsaturated groups as well as the size of the sucrose esters, a means is obtained for crosslinking to impart strength, and the molecule can be modified to increase further water resistance.

The data of Table 15 are taken by adding SEFOSE® to a bleached kraft sheet at varying levels and obtaining wet tensile data. The percentages shown in the table represent the percent sucrose ester of the treated 70# bleached paper (see Table 15).

TABLE 15

| % SEFOSE ® | Load | Strain/Modulus |
|---|---|---|
| 0% | 4.98 | 0.93/89.04 |
| 1% | 5.12 | 1.88/150.22 |
| 5% | 8.70 | 0.99/345.93 |
| 10% | 10.54 | 1.25/356.99 |
| Dry/untreated | 22.67 | |

The data illustrate a trend that wet strength increases as loading level increases. The dry tensile shows the maximum strength of the sheet as a point of reference.

Example 16. Method of Producing Sucrose Esters Using Acid Chlorides

In addition to making hydrophobic polyol esters via transesterification, similar hydrophobic properties can be achieved in fibrous articles by directly reacting acid chlorides with polyols containing ring structures.

For example, 200 grams of palmitoyl chloride (CAS 112-67-4) were combined with 50 grams of sucrose and mixed at room temperature. The mixture was brought to 100° F. and maintained at that temperature overnight (ambient pressure). The resulting material was washed with acetone and deionized water to remove any unreacted or hydrophilic materials. Analysis of remaining material using $C^{13}$ NMR showed a significant quantity of hydrophobic sucrose ester had been made.

While addition of fatty acid chlorides to cellulosic materials could impart hydrophobic properties, the reaction is undesirable as the by-product, gaseous HCl, creates a number of problems including corrosion of surrounding materials and is hazardous to workers and the surrounding environment. One additional problem created by the production of hydrochloric acid is that as more is formed, i.e., more polyol sites are reacted, the weaker the fibrous composition becomes. For example, palmitoyl chloride was reacted in increasing amounts with cellulose and cotton materials and as hydrophobicity increased, strength of the article decreased.

The reaction above was repeated several times using 200 grams of R—CO-chloride reacted with 50 grams each of other similar polyols, including corn starch, xylan from birch, carboxymethylcellulose, glucose and extracted hemicelluloses with similar results.

Example 17. Peel Test

Peel test utilizes a wheel between the two jaws of the tensile tester to measure force needed to peel tape off the surface of a paper as a reproducible angle (ASTM D1876; e.g., 100 Series Modular Peel Tester, TestResources, Shakopee, Minn.).

Bleached kraft paper with high Gurley (600 seconds) from Turners Falls paper (Turners Falls, Mass.) was used. The #50 pound sheet represents a fairly tight, but quite absorbent sheet.

When the #50 pound paper was coated with 15% modified starch (Ethylex starch) as a control, the average force (over 5 samples) needed was 0.55 pound/inch. When treated with the same coating but with SEFOSE® substituted for 25% of the Ethylex starch (so 25% pickup is SEFOSE®, 75% is still Ethylex) the average force decreased to 0.081 pounds/inch. With a 50% substitution of SEFOSE® for Ethylex, the force needed decreased to less than 0.03 pounds per inch.

Preparation of that paper is in accord with TAPPI standard method 404 for determining tensile strength of papers.

Finally, the same paper was used with S-370 at a loading rate of 750 pounds per ton—which effectively fills all the pours in the sheet creating a complete physical barrier. That paper passes a TAPPI kit 12 on the flat. It is possible to get grease resistance using saturated PFAE varieties.

Example 18. Zein-SFAE Compositions

A. Mid Range DS.

One hundred grams of sucrose fatty acid ester containing saturated fatty acid moieties (Fooding Group Ltd., Shanghai, Calif.), having approximately 3-4 saturated fatty acid chains attached to the sucrose molecule, was weighed into a beaker. Heat was applied until the ester changed from a white powder to a highly viscous melted waxy substance. Thirty grams of pure zein (Freeman Industries LLC, Tuckahoe, N.Y.) were introduced into the ester. The yellow powder melted into the ester and heat was removed. The mixture was left to stand for 10 minutes. Using a benchtop homogenizer, the mixture was stirred while warm water was added. Approximately 600 g of water yielded a free flowing homogeneous zein-ester mixture which had no visible solids or precipitate, or phase separation for at least 100 hours.

The same ester was blended with hot water and coated on a bleached, 35#, 18 Gurley base paper. At a coat weight of 4 g/m², a TAPPI kit 4 was achieved. Increasing the coat weight did not seem to increase the kit value when the PFAE was used alone, however, the ester did cause grease to bead-up on the paper. The work was reproduced again using the ester mixed with calcium carbonate and applied to the same paper. At 4 g/m² a kit 3 was achieved.

When the combined zein-SFAE was applied to various base sheets via benchtop drawdown coater, a TAPPI kit 2-6 range was observed, which kit values were dependent on the tightness of the base sheet and coat weight applied. For example, using a bleached base sheet having a Gurley of 250, a kit 6 was achieved when at least 4 g/m$^2$ of coating was applied. It is expected that other additives may be added to remove air bubbles, inhibit spoilage via bacteria, and aid in optimizing protein confirmation, i.e., particle size.

One hundred grams of sucrose fatty acid esters containing saturated fatty acid moieties (RYOTO™ 5370 and B370 from Mitsubishi Chemical, Tokyo, JP) having an HLB of about 3 and with a DS of 3-5 are weighed into each of two beakers. Heat is applied to the samples until the esters melt. Thirty grams of zein (Freeman Industries LLC, Tuckahoe, N.Y.) are introduced into each beaker. The yellow powder melts into the ester and heat is removed. The mixtures are left to stand for 10 minutes. Using a benchtop homogenizer, the mixtures are stirred while warm water is added to each beaker. Water is added until a homogeneous zein-ester mixture is obtained.

When the combined zein-PFAE mixtures are applied to various base sheets via benchtop drawdown coater, treated papers with higher kit value and oil repellency are obtained.

Zein is necessary to achieve mid-high level kit values. While not being bound by theory, it is noteworthy that the zein-ester synergy might allow new ways of formulating for those who need low kit, in the 3-4 range, and have no coater capability on site. Additionally, it might allow for achieving kit with some level of pigment.

B. Low Range DS

One hundred grams of sucrose fatty acid ester containing saturated fatty acid moieties, having approximately 1 to 2 saturated fatty acid chains attached to the sucrose molecule, is weighed into a beaker. Heat is applied until the ester melts. Thirty grams of pure zein is added to the ester. When blended, heat is removed. The mixture is left to stand. Using a benchtop homogenizer, the mixture is stirred while warm water is added to create a free flowing zein-SFAE mixture.

The combined zein-SFAE is applied to various base sheets via benchtop drawdown coater to yield treated paper where grease and oil beaded.

One hundred grams of sucrose fatty acid ester containing saturated fatty acid moieties (RYOTO™ L1695 and P1670 from Mitsubishi Chemical, Tokyo, JP) having an HLB of 16 indicating 1-2 saturated fatty acid chains attached to the sucrose molecule are weighed into each of two beakers. Heat is applied to the samples until the esters melt. Thirty grams of zein (Freeman Industries LLC, Tuckahoe, N.Y.) are introduced into each beaker. The yellow powder melts into the ester and heat is removed. The mixtures are left to stand for 10 minutes. Using a benchtop homogenizer, the mixtures are stirred while warm water is added to each beaker. Water is added until a homogeneous zein-ester mixture is obtained.

When the combined zein-PFAE mixtures are applied to various base sheets via benchtop drawdown coater, treated papers with higher kit values and demonstrated oil repellency are obtained.

Example 19

Cup base stock was found to be heavily treated with rosin to increase water resistance. However, the Gurley on that board was found to be 50 seconds indicating a fairly porous board. That material is repulpable and steam quickly penetrates and softens the material. Pure SEFOSE® was applied to that board and dried in an oven at 100° C. overnight. The resulting material had a plastic-like feel and was completely waterproof. By mass, the material was 50% (wt/wt) cellulose/50% (wt/wt) SEFOSE®. The Gurley was too high to measure. Submerging a sample in water for 7 days did not significantly soften the material. Greenhouse data revealed the material to biodegrade in approximately 150 days. Common tapes and glues would not stick to this composite material.

Experiments with saturated PFAE and zein have been carried out, as zein has been shown to impart grease resistance to paper. Stable aqueous dispersions of zein (up to 25% in water) to which saturated PFAE was added from 2 to 5% were generated. Observations demonstrated that saturated PFAE, "locks down," zein on paper by imparting water resistance (in addition to grease resistance) to the formulation.

Although the invention has been described with reference to the above examples, it will be understood that modifications and variations are encompassed within the spirit and scope of the invention. Accordingly, the invention is limited only by the following claims. All and each reference disclosed herein hereby is incorporated by reference in entirety.

What is claimed:

1. A barrier coating, comprising:
   a prolamine, and
   at least one polyol fatty acid ester (PFAE),
   wherein said polyol comprises a cyclic structure and 1 to 2 fatty acid moieties or 3 to 5 fatty acid moieties, and at least one fatty acid moiety is saturated, and
   said polyol comprises a monosaccharide, a disaccharide, or a trisaccharide.

2. An article comprising the coating of claim 1, wherein the coating is present at a sufficient concentration to cause a surface of said article to become substantially resistant to application of oil and/or grease.

3. The article of claim 2, selected from the group consisting of paper, paperboard, paper pulp, a carton for food storage, a bag for food storage, a shipping bag, a container for coffee or tea, a tea bag, bacon board, diapers, weedblock/barrier fabric or film, mulching film, plant pots, packing beads, bubble wrap, oil absorbent material, laminates, envelops, gift cards, credit cards, gloves, raincoats, OGR paper, a shopping bag, a compost bag, release paper, eating utensil, container for holding hot or cold beverages, cup, paper towels, plate, a bottle for carbonated liquid storage, insulating material, a bottle for non-carbonated liquid storage, film for wrapping food, a garbage disposal container, a food handling implement, a lid for a cup, a fabric fibre, a water storage and conveying implement, a storage and conveying implement for alcoholic or non-alcoholic drinks, an outer casing or screen for electronic goods, an internal or external piece of furniture, a curtain, upholstery, film, box, sheet, tray, pipe, water conduit, packaging for pharmaceutical products, clothing, medical device, contraceptive, camping equipment, cellulosic material that is molded and combinations thereof.

4. The barrier coating of claim 1, wherein the prolamine is selected from the group consisting of zein, hordein, gliadin, kafirin and combinations thereof.

5. The barrier coating of claim 1, wherein said polyol comprises a sucrose or a lactose.

6. The barrier coating of claim 1, wherein said polyol comprises 2 fatty acid moieties or 3 to 5 fatty acid moieties, and at least one a-fatty acid moiety is unsaturated.

7. The barrier coating of claim 1, further comprising one or more materials selected from the group consisting of polyvinyl alcohol (PvOH), polylactic acid (PLA), clay, talc, precipitated calcium carbonate, ground calcium carbonate, natural and synthetic latexes, glyoxyl and combinations thereof.

8. The barrier coating of claim 1, wherein said fatty acid is obtained from a natural source.

9. The barrier coating of claim 1, wherein said fatty acid is obtained from an oilseed.

10. The barrier coating of claim 9, wherein the oilseed is selected from the group consisting of soybeans, peanuts, rapeseeds, barley, canola, sesame seeds, cottonseeds, palm kernels, grape seeds, olives, safflowers, sunflowers, copra, corn, coconuts, linseed, hazelnuts, wheat, rice, potatoes, cassavas, legumes, camelina seeds, mustard seeds, and combinations thereof.

11. The barrier coating of claim 1, wherein said polyol comprises sucrose and a fatty acid is obtained from an oilseed.

12. The barrier coating of claim 1, wherein the coating is biodegradable and/or compostable.

13. A method for tuneably derivatizing a cellulose-based material for lipid resistance, the method comprising:
    contacting the cellulose-based material with the barrier coating according to claim 1.

14. The method of claim 13, further comprising removing excess barrier coating.

15. The method of claim 13, wherein the barrier coating is applied on a size press.

16. A barrier coating consisting essentially of:
    a prolamine, and
    at least one polyol fatty acid ester (PFAE),
    wherein said polyol comprises a cyclic structure and 1 to 2 fatty acid moieties or 3 to 5 fatty acid moieties, and
    said polyol comprises a monosaccharide, a disaccharide, or a trisaccharide.

17. An article comprising the coating of claim 16, wherein the coating is present at a sufficient concentration to cause a surface of said article to become substantially resistant to application of oil and/or grease in the absence of secondary lipophobes.

18. The barrier coating of claim 16, further comprising an inorganic particle selected from the group consisting of clay, talc, precipitated calcium carbonate, ground calcium carbonate, $TiO_2$ and combinations thereof.

* * * * *